US012810685B2

(12) United States Patent
Balu et al.

(10) Patent No.: US 12,810,685 B2
(45) Date of Patent: Nov. 24, 2026

(54) MUTUALISTIC GAMING INCENTIVE PLATFORM

(71) Applicant: LNW Gaming, Inc., Las Vegas, NV (US)

(72) Inventors: Bharathi Selvan Balu, Thoraipakkam (IN); Denesh Kumar Govindaraj Jeganmohan, Madurai (IN); Umamahesh Takkellapati, Chennai (IN); Sujith Padmini, Namakkal (IN); Balram Ravi, Dindigul (IN); Jagadeesh Chinnaraja, Chennai (IN); Thilagavathi Subramaniam, Tiruppur (IN); Manjuprasath Dayanandan, Chennai (IN); Elamaran Sugumar, Mannargudi (IN); Naveen Mahendran, Chennai (IN)

(73) Assignee: LNW Gaming, Inc., Las Vegas, NV (US)

( * ) Notice: Subject to any disclaimer, the term of this patent is extended or adjusted under 35 U.S.C. 154(b) by 82 days.

(21) Appl. No.: 18/775,836

(22) Filed: Jul. 17, 2024

(65) Prior Publication Data

US 2025/0029446 A1 Jan. 23, 2025

Related U.S. Application Data

(60) Provisional application No. 63/514,969, filed on Jul. 21, 2023.

(51) Int. Cl.

*G06Q 30/02* (2023.01)
*G06F 21/31* (2013.01)
*G07F 17/32* (2006.01)

(52) U.S. Cl.

CPC .......... *G07F 17/3255* (2013.01); *G06F 21/31* (2013.01); *G07F 17/3276* (2013.01)

(58) Field of Classification Search

CPC ............. G07F 17/3255; G07F 17/3276; G07F 17/3225; G07F 17/3239; G07F 17/3244; G06F 21/31

See application file for complete search history.

(56) References Cited

U.S. PATENT DOCUMENTS 4,869,500 A 9/1989 Williams
5,816,918 A 10/1998 Kelly et al.
(Continued)

OTHER PUBLICATIONS

"slotstemple mobile tournaments" (website published at https://www.slotstemple.com/us/tournaments/ online Nov. 11, 2021 retrieved by Examiner using Internet Wayback Machine on Jul. 4, 2026) (Year: 2021).*

*Primary Examiner* — James M Detweiler

(57) ABSTRACT

Systems and methods are provided for performing operations, of one or more electronic processors, which operations include awarding virtual value object(s) in response to online gaming activity performed by a user account/profile via an online gaming application using a user computing device external to a casino system. The operations further include automatically entering the user account into an online game tournament conducted via the online gaming application. The operations further include computing, based on game outcome results for the user account/profile during the online game tournament, a placement of the user account/profile on a leaderboard for the online game tournament. The operations further include determining that the user account is a winning placement on the leaderboard and awarding casino value object(s) to the user account/profile. The casino value object(s) are usable via the casino system.

14 Claims, 24 Drawing Sheets

(56) References Cited

U.S. PATENT DOCUMENTS

| | | | |
|---|---|---|---|
| 5,851,147 A | 12/1998 | Stupak et al. | |
| 6,033,307 A | 3/2000 | Vancura | |
| 6,068,552 A | 5/2000 | Walker et al. | |
| 6,179,710 B1 | 1/2001 | Sawyer et al. | |
| 6,241,608 B1 | 6/2001 | Torango | |
| 6,315,665 B1 | 11/2001 | Faith | |
| 6,358,147 B1 | 3/2002 | Jaffe et al. | |
| 6,443,843 B1 | 9/2002 | Walker et al. | |
| 6,454,649 B1 | 9/2002 | Mattice et al. | |
| 6,857,959 B1 | 2/2005 | Nguyen | |
| 7,390,264 B2 | 6/2008 | Walker et al. | |
| 7,753,772 B1 | 7/2010 | Walker et al. | |
| 7,780,522 B2 | 8/2010 | Lutnick et al. | |
| 8,241,123 B2 | 8/2012 | Kelly et al. | |
| 8,251,791 B2 | 8/2012 | Baerlocher et al. | |
| 8,357,034 B2 | 1/2013 | Smith et al. | |
| 8,512,131 B2 | 8/2013 | Iddings et al. | |
| 8,591,330 B2 | 11/2013 | Kelly et al. | |
| 8,900,053 B2 | 12/2014 | Graham et al. | |
| 9,159,193 B2 | 10/2015 | Walker et al. | |
| 9,972,171 B2 | 5/2018 | Marston et al. | |
| 10,319,183 B2 | 6/2019 | Soo | |
| 10,643,431 B2 | 5/2020 | Chesworth et al. | |
| 11,113,778 B2 | 9/2021 | Pimienta et al. | |
| 12,014,599 B2 | 6/2024 | Bachman et al. | |
| 2002/0077174 A1 | 6/2002 | Luciano et al. | |
| 2002/0138342 A1 | 9/2002 | Clark et al. | |
| 2006/0211482 A1 | 9/2006 | Pimienta et al. | |
| 2011/0059800 A1* | 3/2011 | Anderson | G07F 17/326<br>463/42 |
| 2011/0118009 A1* | 5/2011 | Bone | G07F 17/3295<br>463/25 |
| 2012/0122561 A1* | 5/2012 | Hedrick | A63F 13/792<br>463/25 |
| 2014/0274308 A1 | 9/2014 | Guinn et al. | |
| 2020/0020065 A1 | 1/2020 | Pimienta et al. | |
| 2021/0043041 A1* | 2/2021 | Thomas | G07F 17/3213 |
| 2022/0215722 A1* | 7/2022 | Moore | G07F 17/3276 |

* cited by examiner

MUTUALISTIC GAMING INCENTIVE PLATFORM

CROSS-REFERENCE TO RELATED APPLICATION(S)

This patent application claims priority benefit of U.S. Provisional Patent Application No. 63/514,969 filed Jul. 21, 2023. The disclosure of the 63/514,969 Application is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD

The present disclosure relates generally to gaming bonusing systems or casino-patron loyalty systems.

BACKGROUND

Conventional gaming systems include many different types of games that are provided to users through a variety of different gaming channels. For instance, wagering game machines, such as slot machines, video poker machines and the like, have been a central part of the gaming industry for several years. Generally, the popularity of such machines depends on the likelihood (or perceived likelihood) of winning money or other awards of value at the machine and the intrinsic entertainment value of the machine relative to other available gaming options. In some cases, the perceived likelihood of winning something of value at a machine may be based on the amount of trust users place in the machine and machine operator.

With the prevalence of a wide variety of gaming systems being available a number of systems have been proposed to provide improvements to user gaming experiences. For example, some casino gaming systems allow users to earn casino rewards in association with game play associated with a user account or reward card. These casino rewards can be applied to casino game play or casino services. Other gaming systems, such as online game-play venues (e.g., SciPlay.com) offer online rewards which can be applied to online game play or used to redeem other items of value external to a casino. However, while these conventional systems seek to increase user engagement through new and interesting games, loyalty benefits, and the like, these systems are typically not integrated.

A user wishing to redeem or apply a reward is often limited in their ability to do so. For example, there may be use restrictions limiting redemption to certain parties or at particular locations. Moreover, many of these systems do not provide transferrable instruments nor the ability to record information relating to rewards and/or redemptions.

SUMMARY

According to an embodiment of the present disclosure, a system and/or method(s) to perform operations for awarding virtual value object(s) in response to online gaming activity performed by a user account/profile via an online gaming application using a user computing device external to a casino system. The operations further include automatically entering the user account into an online game tournament conducted via the online gaming application. The operations further include computing, based on game outcome results for the user account/profile during the online game tournament, a placement of the user account/profile on a leaderboard for the online game tournament. The operations further include determining that the user account is a winning placement on the leaderboard and awarding casino value object(s) to the user account/profile. The casino value object(s) are usable via the casino system.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
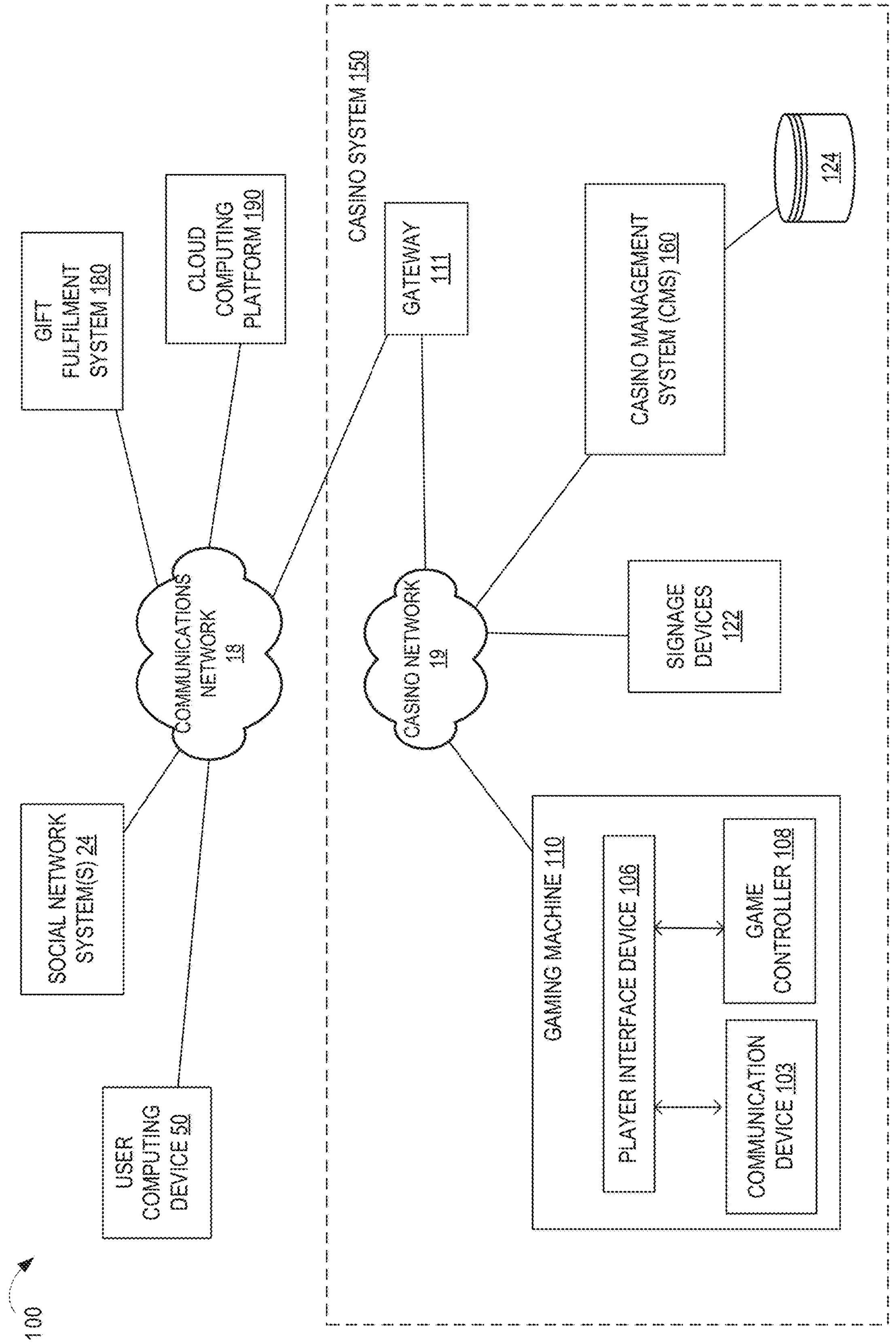
FIG. 1 is a diagram depicting an example gaming system 100 in accordance with one or more example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

As referenced herein, the term "player" refers to an entity such as, for example, a human, a user, an end-user, a consumer, an organization (e.g., a company), a computing device and/or program (e.g., a processor, computing hardware and/or software, an application, etc.), an agent, a machine learning (ML) and/or artificial intelligence (AI) algorithm, model, system, and/or application, and/or another type of entity that can implement one or more embodiments of the present disclosure as described herein, illustrated in the accompanying drawings, and/or included in the appended claims. As referenced herein, the terms "or" and "and/or" are generally intended to be inclusive, that is (i.e.), "A or B" or "A and/or B" are each intended to mean "A or B or both." As referred to herein, the terms "first," "second," "third," etc. can be used interchangeably to distinguish one component or entity from another and are not intended to signify location, functionality, or importance of the individual components or entities. As used herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling.

An electronic processor for a bonusing platform (e.g., CMS 160 in connection with cloud computing platform 190, etc.) awards and manages virtual value object(s) that a player can earn via performance of user activity via an online gaming application. The virtual value object(s) include virtual coins that permit the player to access online gaming content, to register for and participate in online-game play tournaments, etc. Further, based on the online game play, the electronic processor further awards and manages casino value object(s) (e.g., loyalty program points, exclusive gift benefits, etc.) that a player can use in a physical (e.g., land-based) casino setting. Thus, the bonusing platform provides a player/patron with an opportunity to experience a similar type of entertainment experience via online game play as they did in a casino. Further, the platform increases the entertainment value to the player. Further, the platform provides opportunities for a player to earn rewards and winnings. In addition, a casino/operator benefits by providing marketing opportunities, which increases patron visits to the physical casino environment and also increases casino revenue. Furthermore, in one example, the platform provides, to a game developer of gaming content (e.g., Light & Wonder, Inc.) and/or an online game content provider (e.g., SciPlay.com) potential commission-based revenue based on increases to play in either venue. Furthermore, the platform provides an opportunity for the game developer to offer promotions or upsell via the online gaming application (e.g., via a mobile application used on a player mobile device).

FIG. 1 is a diagram depicting an example gaming system 100 in accordance with example embodiments of the present disclosure. The gaming system 100 (also referred to herein as a mutualistic gaming incentive platform or a bonusing platform) includes a plurality of computing devices that are communicatively coupled over one or more networks. In this example, the computing devices include one or more gaming devices, systems, channels, etc. within casino system 150. Examples of the computing devices include gaming machine 110, casino management system (CMS) 160, player interface device 106, signage devices 122, gateway 111, casino network 19, etc. Casino system 150 is a computerized environment associated with a physical casino, such as one or more computerized devices connected via one or more local electronic networks (e.g., via a local area network (LAN), via casino network 19, etc.). The gateway 111 is authorized to communicate with the computerized devices in the casino network 19. The gateway 111 is further configured to provide electronic communication between the computerized devices of the casino system 150 and other devices that are not connected to the local area network.

The gaming system 100 further includes additional computing devices which are external to casino system 150, such as social network system(s) 24, gift fulfillment system 180, communications network 18, etc. User computing device 50 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. The number and type of computing devices in the gaming system 100 are depicted, in FIG. 1, by way of example only. For example, other computing environments may include additional user computing devices 50, fewer or additional gaming channel systems, etc. than those depicted in FIG. 1. In another example, physical gaming systems may represent a single electronic gaming machine (EGM) at a gaming location (e.g., gaming machine 110) or multiple EGM's and/or associated computing devices such as one or more physical gaming servers that support the EGMs or client devices. Social network system(s) 24 may represent a user device executing a local client application and/or server device providing an online social network service. In some example embodiments, the various gaming channel devices may be under control and operation by a single entity such as a gaming operator. In other examples, the gaming channel systems may be under the control of multiple different entities. For example, a first gaming entity may operate a physical gaming server while a different gaming entity may operate a lottery server or online gaming server. Furthermore, gift fulfillment system 180 may include any number of computing devices and/or perform operations as those described in U.S. patent application Ser. No. 17/483,036, filed Sep. 3, 2021, which Ser. No. 17/483,036 Application is hereby incorporated by reference in its entirety. For example, the gift fulfillment system 180 may be configured to interface (e.g., via communications network 18 and/or via casino network 19 and gateway 111) with a store front gateway, store front server, etc. for an online store or e-tailer (such as Amazon.com), that offers products for purchase. The store front server has access to a product inventory for the online store. The store front gateway can select specific items from the product inventory and designate them for use as promotional gifts. The store front gateway stores information about the selected items from the product inventory in the promotions inventory. The promotions inventory includes only a subset of the entire product inventory available by the online store. For example, the store front gateway may be associated with a third-party business entity that finds and arranges promotional gifts from one or more store fronts and organizes access to the promotional gift items to configure promotions, track selections of gift items, and perform electronic transactions with the store front server (e.g., to process the purchase and shipping of the gift item on behalf of a player account). For instance, the gift fulfilment system 180 (in connection with the CMS 160) can configure (e.g., in response to use of a casino value object earned from a winning leaderboard placement in an online tournament) a specific gifting promotion (from options available by store front gateway). For example, the CMS 160 can select a limited number (e.g., a subset) of the items in a promotions inventory as available gift items to be earned (by a user account/profile) in a casino gifting promotion where the player has the opportunities to earn exclusive gifts via casino play. The limited number of items may be made available only as a result of a tournament placement in an online game tournament. In one embodiment, the gift fulfilment system 180 is configured to access information such as player data (via the CMS 160), to automatically determine a mailing address. In one embodiment, the gift fulfilment system 180 is configured to determine necessary information about the earned gift item, such as to communicate via one or more application programming interfaces (APIs), to access detailed information about the gift item from a database for the products (e.g., from a product inventory), and use the information (e.g., to present a picture of the product, to describe a name for the product, to determine a number of the products available, etc.). The gift fulfilment system 180 is further configured to post orders, get order statuses, cancel orders, etc. via use of the APIs (e.g., to process an order for any of the specific items in a promotions inventory). Further, the gift fulfilment system 180 is configured to receive (e.g., from the CMS 160) player data relevant to shipping of the product (e.g., receives and uses a mailing address associated with a player account). In some embodiments, the gift fulfilment system 180 is configured to communicate with a widget of the player interface device 106 (e.g., via an iView® user interface product, manufactured by Light & Wonder, Inc.) to present a user interface (e.g., a "Player Boutique" dashboard described in the Ser. No. 17/483,036 Application). The gift fulfilment system 180, in connection with the CMS 160, is/are configured to provide (for presentation via the player interface device 106 and/or via a user interface of the user computing device 50) options for tracking earned reward points that can be used toward selection of a gift item from the gift inventory. The gift fulfilment system 180 and/or CMS 160 can compute progress levels (for animated progress meters) for any gift items available to be earned via game play.

CMS 160 is authorized to perform transactions with, and/or to securely communicate with, an online gaming application running on the user computing device 50 and with one or more applications that run via player interface device 106, via game controller 108, etc. In some embodiments, some combination of one or more of the player interface device 106, CMS 160, gateway 111 and/or one or more data storage devices (e.g., a database 124, which stores player-related data) may be collectively referred to as a "player tracking system," a "patron management system," etc., or more generally as, or part of, the casino system 150. CMS 160 provides (via player interface device 106) "system-based content" and/or "system-based services." System-based content and/or system-based services may include, but are not necessarily limited to, content related to player benefits, casino services, marketing bonuses, promotions, advertisements, beverage or dining services, or any other information that is relevant to the player's gaming experience other than the wagering game itself. Content for a wagering game may be referred to as game content. Game content, for instance, includes game assets of the wagering game, content related to a bet placed on the game (e.g., bet meters, pay tables, payout/collection, credit meters, number of lines selected for betting, an amount bet per line, a maximum bet, etc.), game play elements of the game (e.g., reels, indicia, game symbols,), game instructions, etc. The term "gaming content," as used herein, comprises both system-based content and game content. Examples of the CMS 160 include, but are not limited to, one or more of the ACSC Casino Management System® product, the SDS® slot-management product, the CMP® player-tracking product, the Elite Bonusing Suite® product, or the Bally Unified Wallet® product, all available from Light & Wonder, Inc.

CMS 160 is configured to award and manage a first type of value object used via the online gaming application. The first type of value object may be referred to herein as a "virtual value object" or "virtual value object(s)" and includes, but is not limited to, a virtual coin(s), non-casino game credit(s), non-monetary object(s), etc., which can be used within the online gaming application. CMS 160 is also configured to award and manage a second type of value object, which is useable in a casino setting (e.g., via a player interface device, via a gaming machine, etc.) to access specific casino gaming content and/or services. In one example, the second type of value object may be referred to herein as a "casino value object" or "casino value object(s)," and includes, but is not limited to, customer loyalty point(s), special gifting option(s), monetary object(s), casino comp(s) or privilege(s) (e.g., unlimited drinks at the casino, a coupon for hotel stay, provide a ticket to access an exclusive tournament held on the casino floor, etc.), etc. As used herein, the term "casino" refers to a physical location of an authorized, physical gaming operator environment, and hence the phrases "casino content," "casino value object(s)," "casino services," etc., refer to the type of content, value objects, services, etc. that are used for authorized casino gaming machines and/or other devices monitored by, and configured for use, in an authorized physical casino setting or environment. Furthermore, as used herein, the phrase "online" or "virtual" (e.g., an "online gaming application," "online gaming content," "online gaming tournament," "virtual value object(s), virtual coins, etc.) refers to an object or activity that is usable, and/or which occurs, outside of a physical casino setting or environment, such as via a non-casino device (e.g., via the online gaming application running on the user computing device 50). In some embodiments, user computing device 50 is not authorized to access casino system 150, hence is not authorized to function as gaming machine 110, nor authorized to present authorized gambling content. In some embodiments, the user computing device 50 can connect to the player interface device 106 (e.g., via the communications device 103, such as via a wireless communications technology (e.g., via Bluetooth®)), for purposes of linking the online gaming application to the CMS 160 during a casino gaming session. However, the link does not authorize the user computing device 50 to present casino gaming content nor to communicate with the game controller 108. Rather, the link permits communication with the user account/profile for purposes of presenting information via the online gaming application, such as for indicating when points have been deducted from the player loyalty account, for indicating when virtual coins (or other virtual value objects) are redeemed to perform or access casino activities, content, services, etc., when new opportunities become available to obtain additional virtual value object(s) for in-casino user activities, and so forth.

The CMS 160 is also configured to manage online game tournaments or other online gaming content (for presentation by the online gaming application). The CMS 160 can award the virtual value object(s) to incentive use of the online gaming application via the user computing device 50 when external to casino system 150 (e.g., when the user computing device 50 is external to a physical location of a casino associated with the casino system 150). For example, the user computing device 50 presents (e.g., animates) options for use via the online gaming application to obtain the virtual value object(s). The user computing device 50 further presents options (e.g., tournament registration) which, when used via the online gaming application, earns the casino value object(s) (e.g., loyalty points, exclusive gift items, etc.) based on placement of the user account/profile on a leaderboard of an online gaming tournament. When the user computing device 50 is used to link to a user account/profile of the casino system 150 and/or when the user account/profile authenticates via the player interface device 106, the casino system 150 (e.g., via CMS 160) can provide opportunities to either use the casino value object(s) or to earn additional virtual value object(s) (for subsequent use via the online gaming application). For instance, the CMS 160 can provide (after authentication to the user account/profile via the player interface device 106) a loyalty point meter that indicates a balance of loyalty points awarded to the user profile/account. The loyalty points can be used to bet on one or more casino games provided by the game controller 108 and/or to play one or more games available as system-based content. The CMS 160 can further provide, while the user account/profile accesses or is connected to casino system 150, opportunities to obtain additional virtual coins that can be used when the user computing device 50 is external to (i.e., not linked to, not accessible by, not physically located within, etc.) the casino system 150.

It will be appreciated that the system of FIG. 1 is provided by way of example and not limitation as other computing systems may be used in accordance with example embodiments of the present disclosure.

Figure 2:
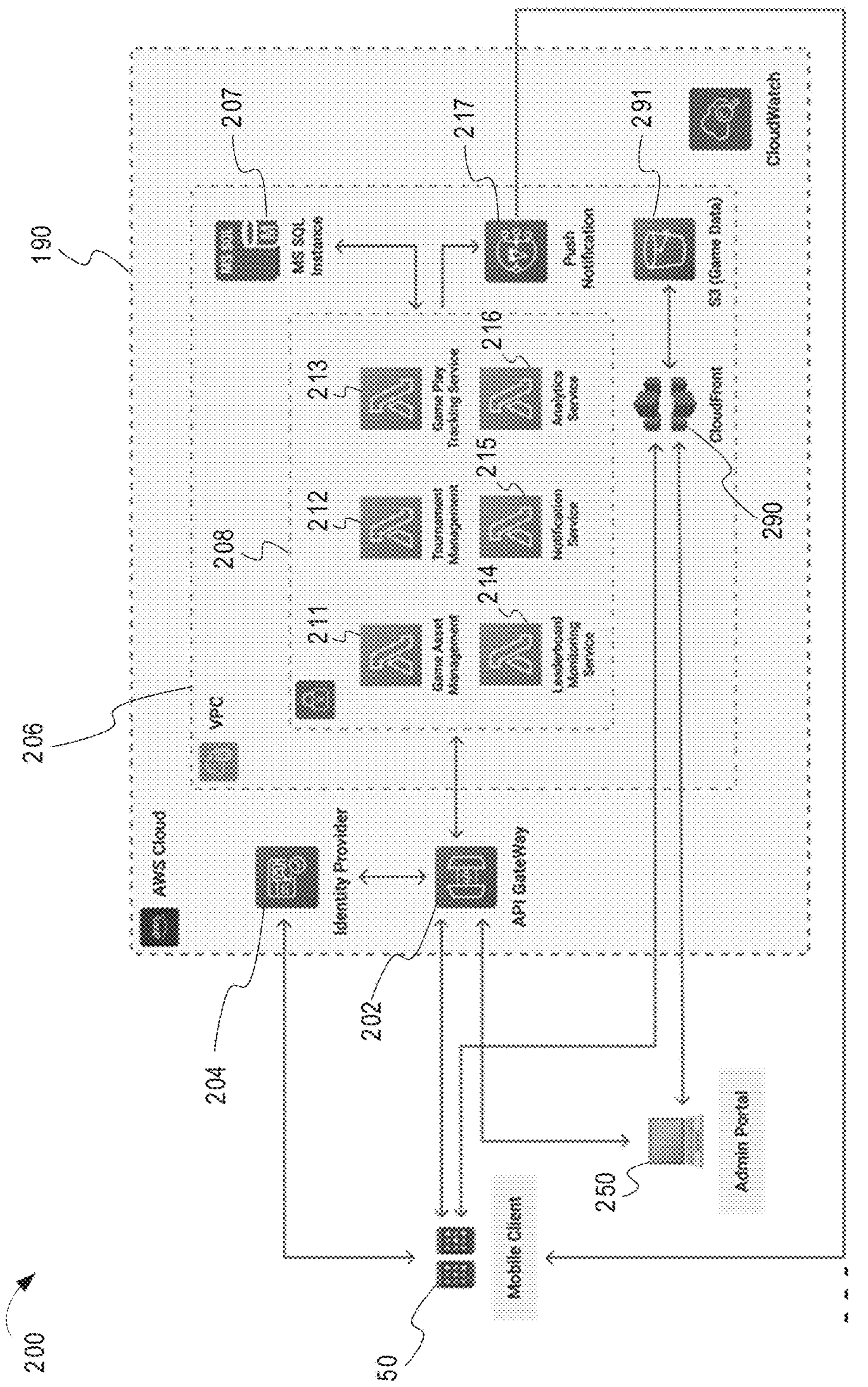
FIG. 2 is an architecture diagram in accordance with one or more example embodiments of the present disclosure.

FIG. 2 is an example architecture 200 according to some embodiments of the present disclosure. As illustrated a mobile client (e.g., running via user computing device 50) connects to a cloud computing platform which hosts a plurality of services used to manage online game play opportunities, such as online game tournaments, as well as to manage (e.g., tracking, awarding, use, etc.) of bonusing benefits, including management of awards and use of value objects such as virtual coins (e.g., redeemable for online game play opportunities), and management of awards and use of loyalty points and/or gift benefits (e.g., redeemable for casino game play opportunities). The mobile client connects via API gateway 202 associated with cloud computing platform 190. Examples of cloud computing platform 90 include the Amazon Web Services® (AWS) cloud computing service by Amazon.com, Inc., the Google Cloud Platform® (GCP) cloud computing service by Google LLC, the Azure® Machine Learning (Azure ML) cloud computing service by Microsoft Corporation, and so forth. The mobile client and the API gateway 202 run in association with an identity provider 204 (e.g., to electronically link and/or authenticate with one or more user account/profiles associated with the CMS 160). The cloud computing platform 190 includes a virtual private network 206 (e.g., Amazon Virtual Private Cloud® available by Amazon.com, Inc.), which hosts a set of services 208 (e.g., using the AWS Lambda® serverless, event-driven compute service) used by the online gaming application running via the mobile client. The virtual private network 206 also includes one or more instances of a database (e.g., database instance 207) used to store and organize data associated with the set of services 208. In one embodiment, the set of services 208 includes a game asset management service 211, a tournament management service 212, a game play tracking service 213, a leaderboard monitoring service 214, a notification service 215, and an analytics service 216. The game asset management service 211 provides game asset bundles and associated asset bundle manifest files (describing asset dependencies associated with image, audio, texture, model, etc.) associated with online gaming content (e.g., for games played via the online gaming application). The tournament management service 212 handles a life cycle of an online game tournament. The game play tracking service 213 tracks or handles each game or spin play. The leaderboard monitoring service 214 monitors tournament progress and once a tournament has ended it creates a leaderboard and transfers points to CMS 160 (e.g., the leaderboard monitoring service 214 transfer points to CMS 160 for the winning players). The notification service 215 triggers one or more push notifications 217 for various scenarios such as tournament creation, points transferred, virtual coins added to the user account/profile, etc. Analytics service 216 provides data for a tournament management dashboard of a game management portal. An administrator computing device 250 is used to access the portal, which portal can be used to indicate a number of tournaments that are created, a number of winners from the tournament, a list of players who visited a casino, an amount of points redeemed at a casino, etc. Furthermore, the portal (via access through the API Gateway 202) can be used to configure and manage online tournaments, to update games configuration, to view data associated with the user account/profile(s), etc. The administrator computing device 250 can manage content via a content delivery network (CDN) 290, such as the Amazon CloudFront® content delivery network (by Amazon.com, Inc.), which connects to an object storage service 291 configured to store and retrieve data (e.g., for creating data buckets, for controlling access to data, for replicating data, for speeding up distribution of static and dynamic web content (e.g., html, .css, .js, and image files) by routing a user request for the content through an AWS backbone network to one specific server or "edge location", etc.).

Figure 8:
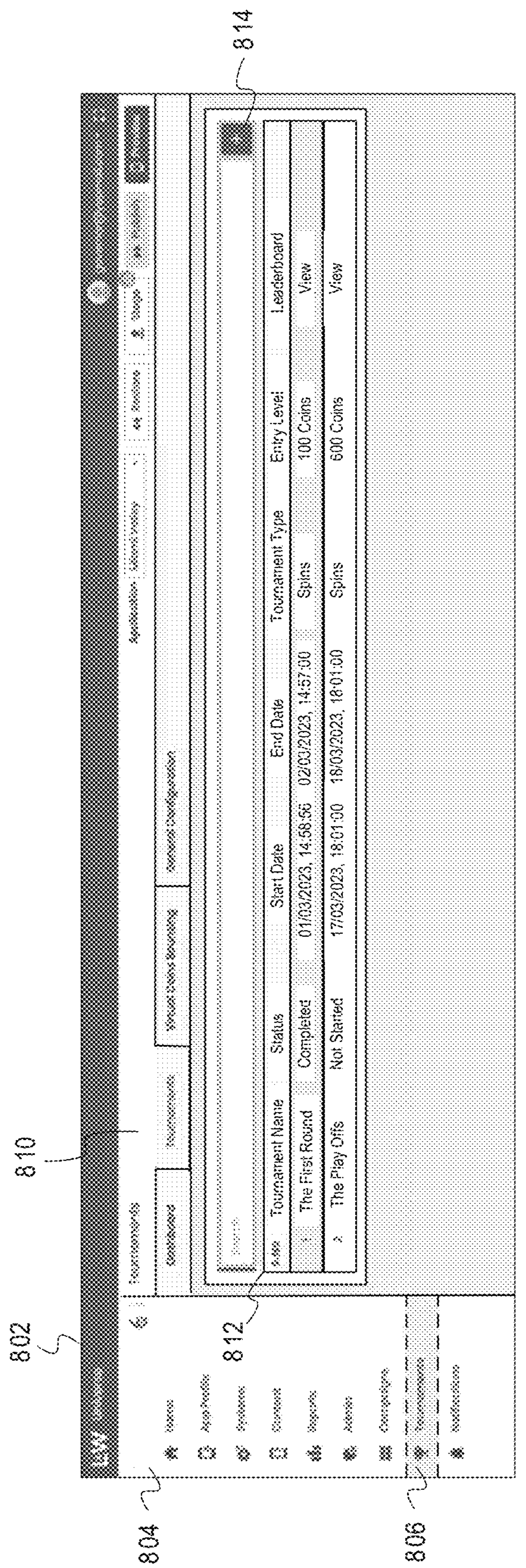
FIG. 8, FIG. 9, FIG. 10A, FIG. 10B, FIG. 11, FIG. 12, and FIG. 13 are diagrams illustrating configuration of an online gaming tournament in accordance with one or more example embodiments of the present disclosure.
Figure 9:
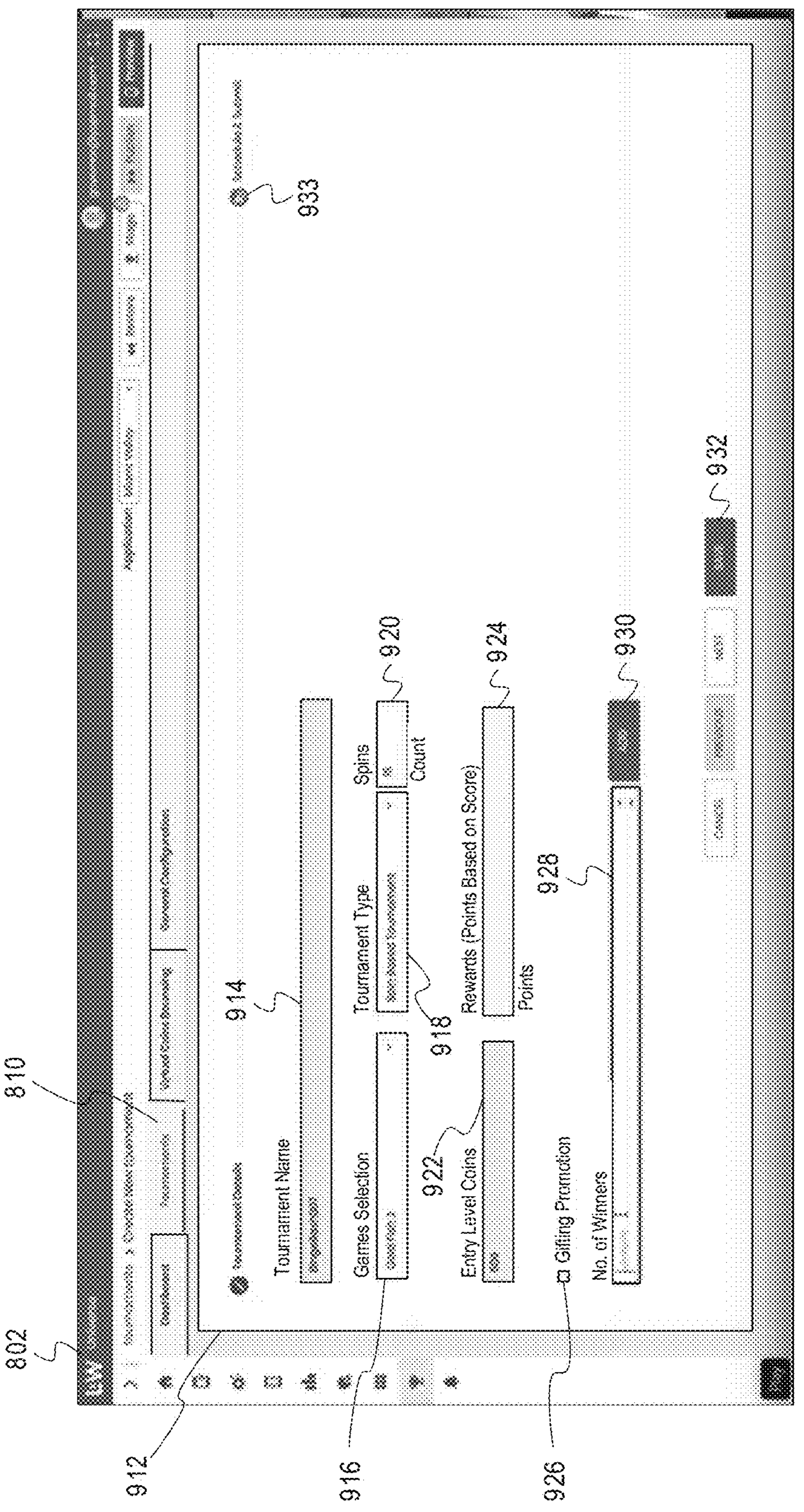

One example of the portal is shown in FIG. 8. For instance, a display of the administrator computing device 250 presents portal interface 802. In one embodiment, the portal interface 802 can be managed using the Light & Wonder Universe™ platform, which is manufactured by Light & Wonder, Inc. The portal interface 802 includes a side menu 804 having an option 806 to configure online game tournaments for the online gaming application. When the option 806 is selected, a tab 810 opens displaying a list 812 of already configured tournaments. User interface control 814 can be selected to create a new tournament. As illustrated in FIG. 9, after the control 814 is selected, the tab 810 displays a new tournament screen 912 having various user interface controls, including, but not limited to, tournament name input control 914, games selection input control 916, tournament type input control 918, duration input control 920, registration requirement input control 922, rewards input control 924, gifting promotion input control 926, eligible winner input control 928, and input control 930.

The tournament name input control 914 is configured to indicate a tournament name.

The games selection input control 916 is configured to select from a list of available online games to be used for the tournament. In some embodiments, the list of available games includes a library of games available from an online game provider, such as games from the SciPlay.com game library.

The tournament type input control 918 is configured to select a specific type of tournament, such as either a "spin based" tournament or a "time based" tournament. For a spin-based tournament, a tournament completion criterion is based on a certain number of spins. For a time-based tournament, a tournament completion criterion is based on an amount of time (e.g., a time limit).

The duration input control 920 is configured to indicate the specific criterion used to indicate completion of the tournament. For example, depending on the selection of the tournament type (i.e., "spin based" or "time based"), the duration input control 920 either asks for a required number of spins (in the case of a "spin based" tournament) or for a time limit (in the case of a "time based" tournament).

The registration requirement input control 922 is configured to indicate a number of virtual coins that are required by the player to enter/register for the tournament.

The rewards input control 924 is configured to indicate an amount of a tournament reward/award for placing in one or more of the top winning positions of the tournament leaderboard.

Figure 10A:
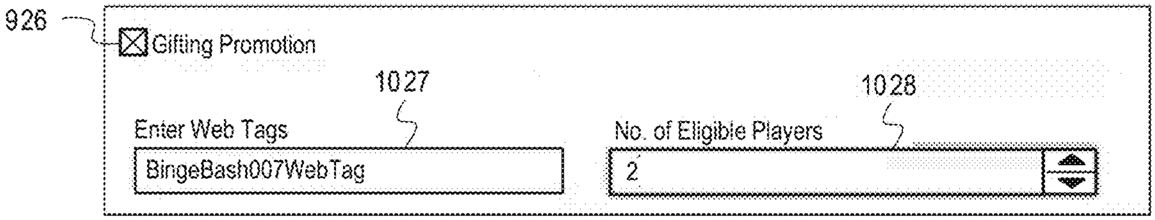

The gifting promotion input control 926 is configured to indicate whether the tournament award includes access to a casino gifting promotion. For example, when the gifting promotion input control 926 is selected, it makes the winning player eligible to participate in (or otherwise link to) a casino promotion (e.g., managed by the CMS 160) to offer gifts to eligible players. (e.g., the Player Boutique® gifting feature offered via the Elite Bonusing System (EBS)® product, available from Light & Wonder, Inc.). In one embodiment, when the gifting promotion input control 926 is selected, as shown in FIG. 10A, additional user input controls can appear, including the web tag identifier control 1027 and the number of eligible participant input control 1028. The web tag identifier control 1027 is configured to identify the tournament for purposes of linking to, and coordinating with, a gifting promotion controller (e.g., for linking to a matching gifting promotion identifier for a gifting promotion provided by the CMS 160). For example, the web tags can be used to identify a promotion created via EBS® titled or identified as "BingeBash007" which uses the web tag identifier called "BingeBash007WebTag". The number of eligible participant input control 1028 indicates the number of eligible players from the top number of players from the leaderboard. Thus, if the number of eligible participant input control 1028 is the value "2", then the top two leaders on the leaderboard at the end of the tournament will be made eligible to see the "BingeBash007" gifting promotion.

Figure 10B:
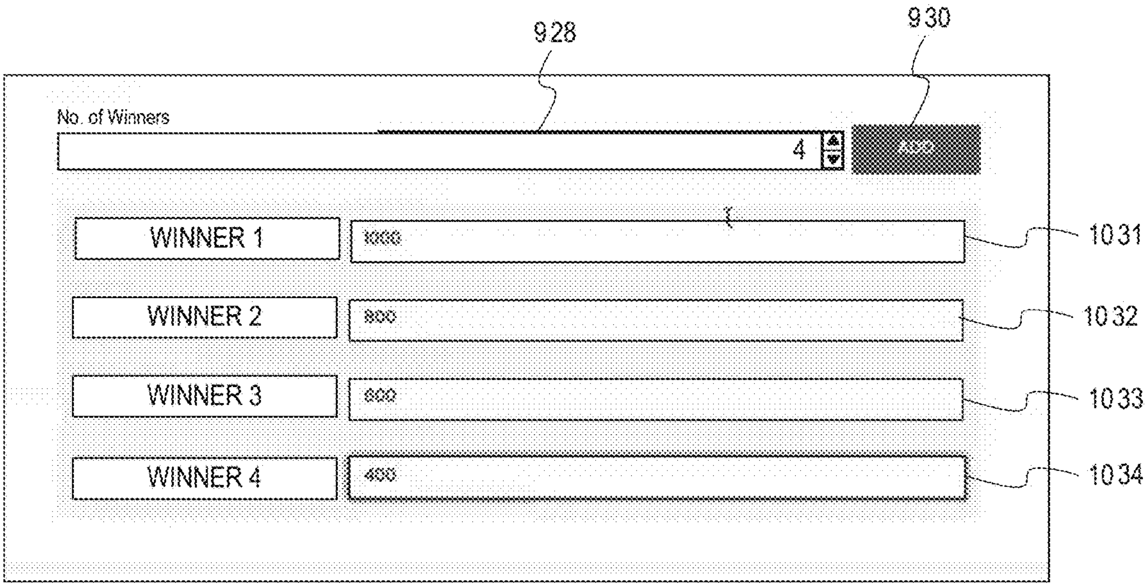

Referring back to FIG. 9, the eligible winner input control 928 is configured to indicate a number of leaders on the leaderboard that will receive at least some portion of the tournament award. If the input control 928 is the value "1," then only the top leaderboard winner will receive the entire award/reward indicated in input control 924. However, if the input control 928 is more than the value "1," then the number of indicated players (who are atop the leaderboard) will split the tournament reward/award. In one embodiment, each of the top eligible winners can receive an equal portion of the tournament reward/award. However, in other embodiments, the top players can split the award based on placement and/or based on an indicated division amount. For example, the input control 930 can be selected for the number of eligible winners, which causes presentation, as illustrated in FIG. 10B, of additional input controls 1031, 1032, 1033, and 1034. The additional input controls 1031, 1032, 1033, and 1034 are used to input a proportional share of the reward/award each of the top players will receive. In some embodiments, the values in the additional input controls 1031, 1032, 1033, and 1034 can be point values (as shown), or in another embodiment, the values in the additional input controls 1031, 1032, 1033, and 1034 can be percentages.

Figure 11:
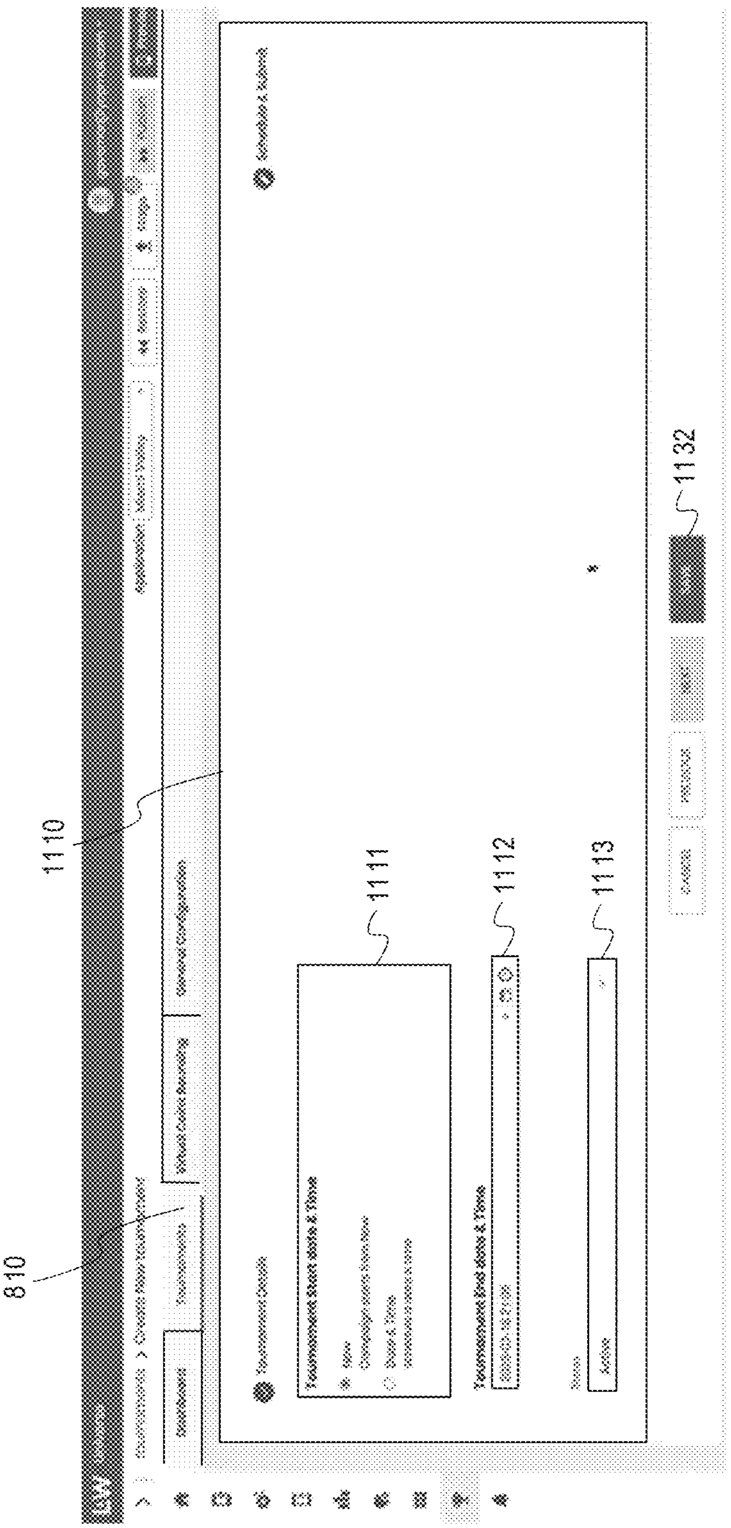
Figure 12:
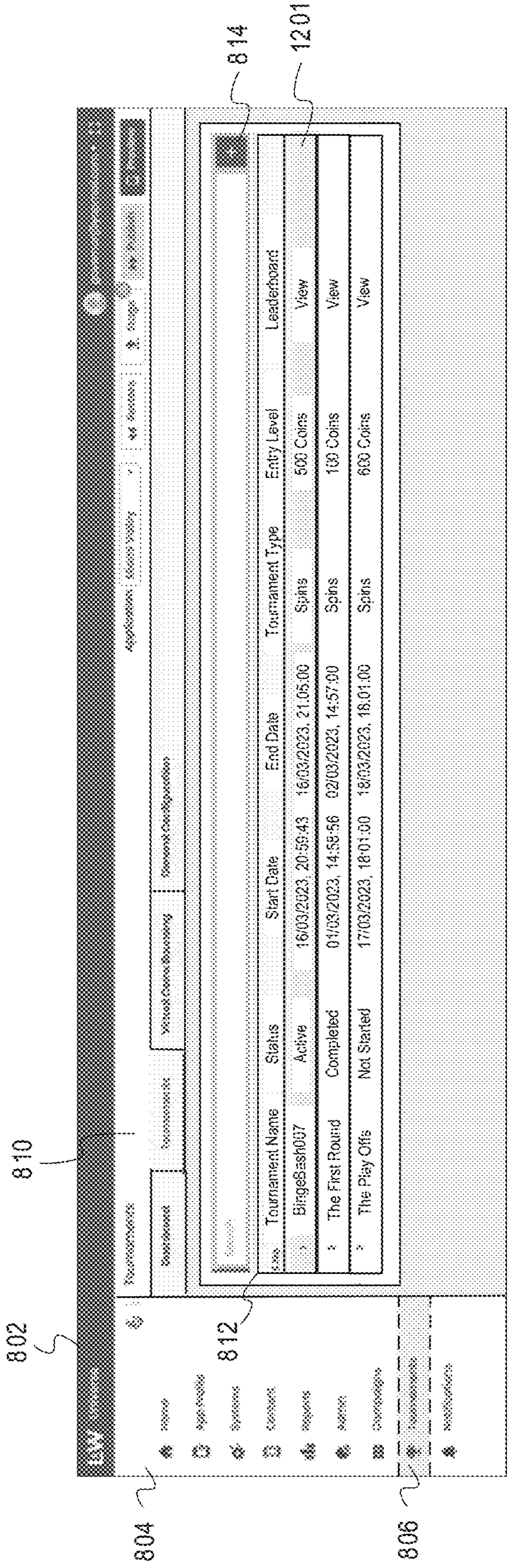
Figure 13:
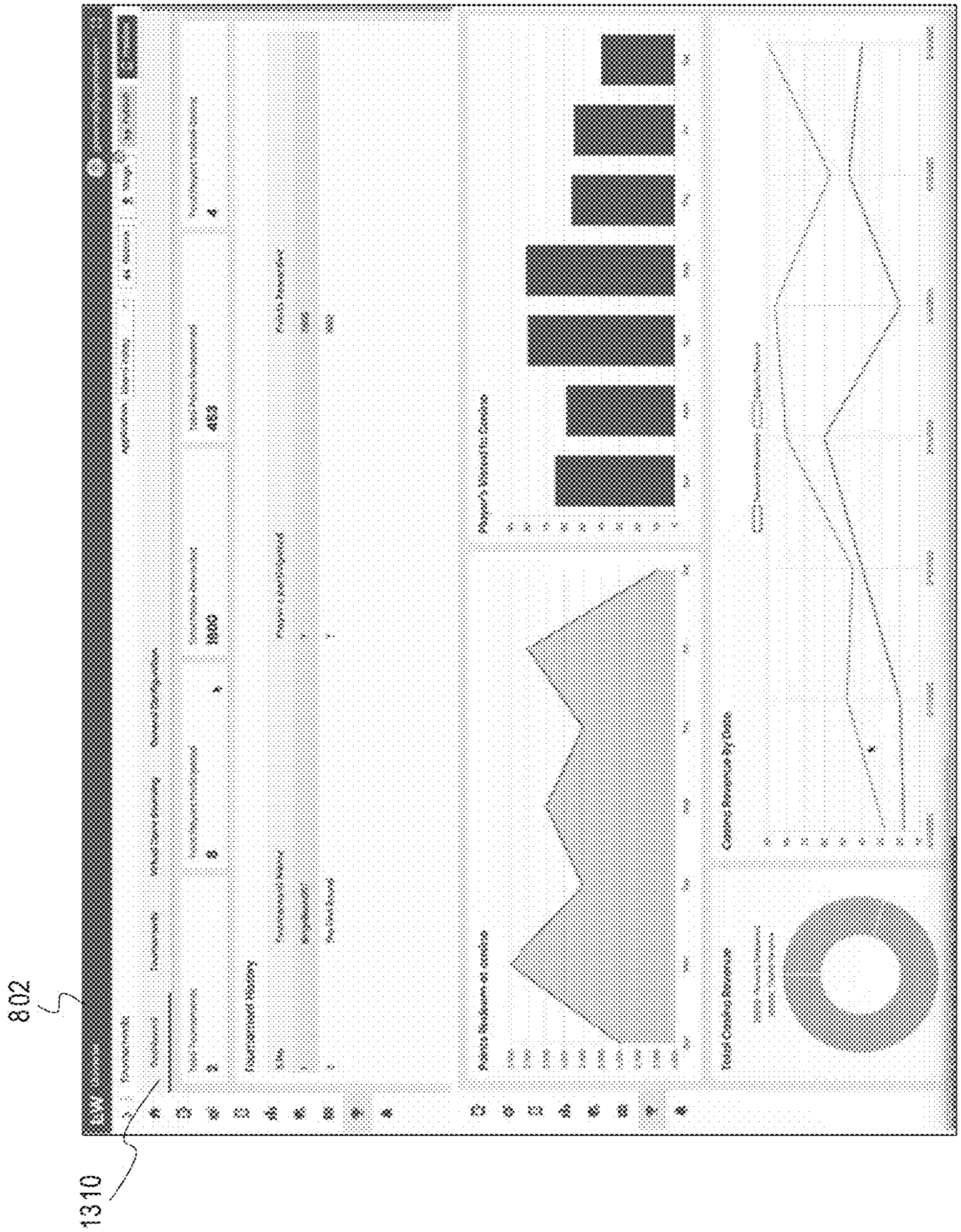

Referring momentarily to FIG. 9, as soon as the information is entered into the tab 810, a save input control 932 can be selected to save the information. Furthermore, after the save input control 932 is selected and/or in response to selection of one or more additional input controls (e.g., schedule and submit control 933), the portal interface 802 displays an additional screen 1110, as shown in FIG. 11, where the administrator can specify, via input control(s) 1111, whether to start the tournament immediately or to schedule a future time/date when available. If the tournament is scheduled for a future time/date, that information can be entered into input control 1112. Furthermore, the tournament status can be entered into input control 1113. After the save input control 1132 is selected, the new tournament entry appears in the list 812. For example, as illustrated in FIG. 12, the tab 810 includes a new entry 1101 indicating a summary view of some details for the tournament configured as shown in FIG. 9, FIG. 10A, FIG. 10B, and/or FIG. 11. As shown in FIG. 13, in addition to the tab 810, the portal interface 802 can present a dashboard tab 1310 that indicates information, statistics, history, etc. associated with a number of active/configured tournaments, a number of players participating, a number of points awarded, a number of points redeemed (e.g., via in-casino user activity), a number of players that have visited a casino (e.g., to use the awarded points, to participate in a gifting promotion, etc.), an amount of casino revenue over time, etc.

Figure 3:
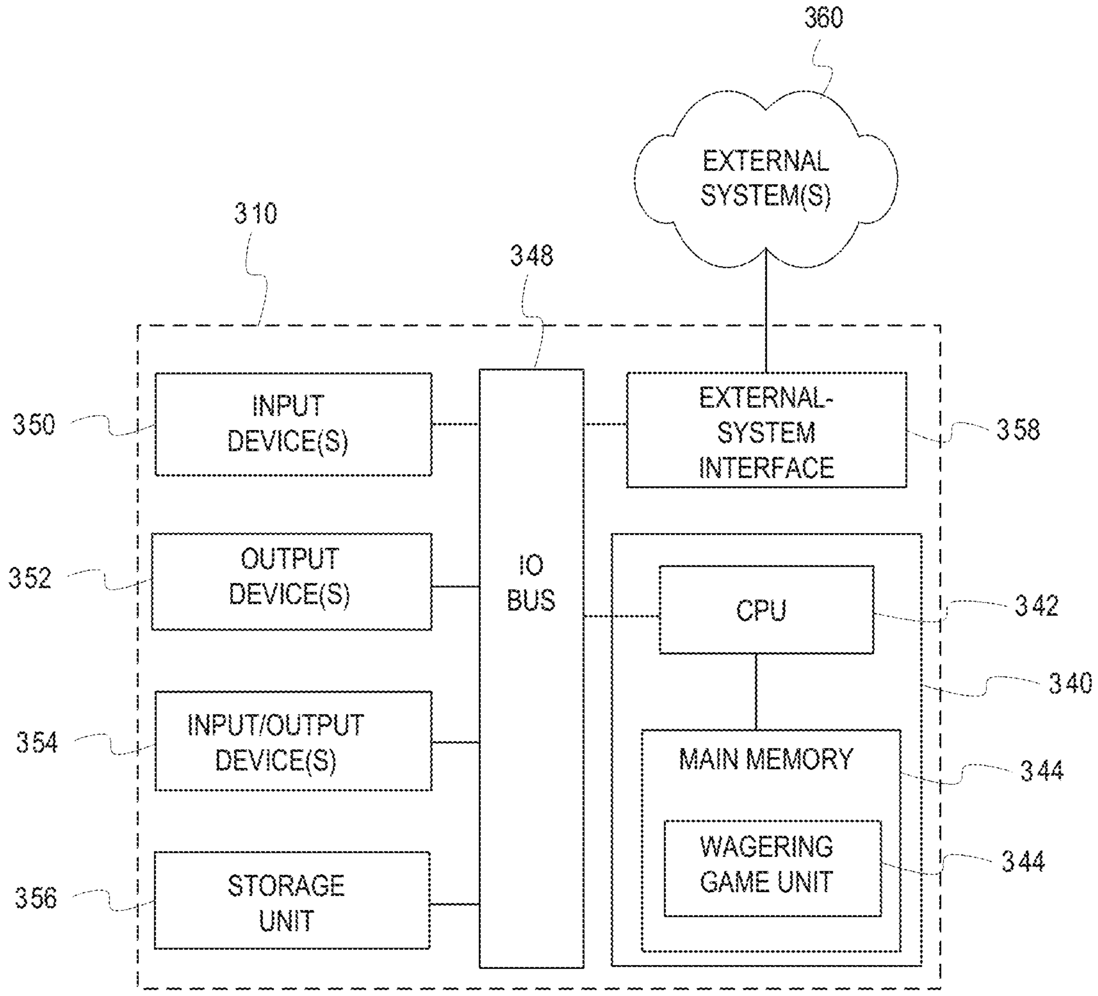
FIG. 3 is a schematic view of a gaming system in accordance with one or more example embodiments of the present disclosure.

FIG. 3 is schematic view of a gaming system in accordance with example embodiments of the present disclosure. Referring to FIG. 3, a gaming machine 310 includes game-logic circuitry 340 (e.g., securely housed within a locked box inside a gaming cabinet). The game-logic circuitry 340 includes a central processing unit (CPU) 342 connected to a main memory 344 that comprises one or more memory devices. The CPU 342 includes any suitable processor(s), such as those made by Intel and AMD. By way of example, the CPU 342 includes a plurality of microprocessors including a master processor, a slave processor, and a secondary or parallel processor. Game-logic circuitry 340, as used herein, comprises any combination of hardware, software, or firmware disposed in or outside of the gaming machine 310 that is configured to communicate with or control the transfer of data between the gaming machine 310 and a bus, another computer, processor, device, service, or network. The game-logic circuitry 340, and more specifically the CPU 342, comprises one or more controllers or processors and such one or more controllers or processors need not be disposed proximal to one another and may be located in different devices or in different locations. The game-logic circuitry 340, and more specifically a main memory 344, comprises one or more memory devices which need not be disposed proximal to one another and may be located in different devices or in different locations. The game-logic circuitry 340 is operable to execute all of the various gaming methods and other processes disclosed herein. The main memory 344 includes a wagering-game unit 346. In one embodiment, the wagering-game unit 346 causes wagering games to be presented, such as video poker, video black jack, video slots, video lottery, etc., in whole or part.

The game-logic circuitry 340 is also connected to an input/output (I/O) bus 348, which can include any suitable bus technologies, such as an AGTL+ frontside bus and a PCI backside bus. The I/O bus 348 is connected to various input devices 350, output devices 352, and input/output devices 354.

By way of example, the output devices may include a primary display, a secondary display, and one or more audio speakers. The primary display or the secondary display may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 310. The gaming machine 310 can also include a touch screen(s) mounted over the primary or secondary displays, buttons on a button panel, a bill/ticket acceptor, a card reader/writer, a ticket dispenser, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, buttons, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The input/output devices 354 include one or more value input/payment devices and value output/payout devices. In order to deposit cash or credits onto the gaming machine 310, the value input devices are configured to detect a physical item associated with a monetary value that establishes a credit balance on a credit meter. The physical item may, for example, be currency bills, coins, tickets, vouchers, coupons, cards, and/or computer-readable storage mediums. The deposited cash or credits are used to fund wagers placed on the wagering game played via the gaming machine 310. Examples of value input devices include, but are not limited to, a coin acceptor, a bill/ticket acceptor (e.g., a bill validator), a card reader/writer, a wireless communication interface (e.g., wireless communication device 102) for reading cash or credit data from a nearby mobile device, and a network interface for withdrawing cash or credits from a remote account via an electronic funds transfer. In response to a cashout input that initiates a payout from the credit balance on the "credits" meter the value output devices are used to dispense cash or credits from the gaming machine 310. The credits may be exchanged for cash at, for example, a cashier or redemption station. Examples of value output devices include, but are not limited to, a coin hopper for dispensing coins or tokens, a bill dispenser, a card reader/writer, a ticket dispenser for printing tickets redeemable for cash or credits, a wireless communication interface for transmitting cash or credit data to a nearby mobile device, and a network interface for depositing cash or credits to a remote account via an electronic funds transfer.

The I/O bus 348 is also connected to a storage unit 356 and an external-system interface 358, which is connected to external system(s) 360 (e.g., wagering-game networks, communications networks, etc.).

The external system(s) 360 includes, in various aspects, a gaming network, other gaming machines or terminals, a gaming server, a remote controller, communications hardware, or a variety of other interfaced systems or components, in any combination. In yet other aspects, the external system(s) 360 comprises a player's portable electronic device (e.g., cellular phone, electronic wallet, etc.) and the external-system interface 358 is configured to facilitate wireless communication and data transfer between the portable electronic device and the gaming machine 310, such as by a near-field communication path operating via magnetic-field induction or a frequency-hopping spread spectrum RF signals (e.g., Bluetooth®, etc.).

The gaming machine 310 optionally communicates with the external system(s) 360 such that the gaming machine 310 operates as a thin, thick, or intermediate client. The game-logic circuitry 340—whether located within ("thick client"), external to ("thin client"), or distributed both within and external to ("intermediate client") the gaming machine 310—is utilized to provide a wagering game on the gaming machine 310. In general, the main memory 344 stores programming for a random number generator (RNG), game-outcome logic, and game assets (e.g., art, sound, etc.)—all of which obtained regulatory approval from a gaming control board or commission and are verified by a trusted authentication program in the main memory 344 prior to game execution. The authentication program generates a live authentication code (e.g., digital signature or hash) from the memory contents and compares it to a trusted code stored in the main memory 344. If the codes match, authentication is deemed a success and the game is permitted to execute. If, however, the codes do not match, authentication is deemed a failure that must be corrected prior to game execution. Without this predictable and repeatable authentication, the gaming machine 310, external system(s) 360, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 342 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 342 when executing the game-outcome logic to determine a resultant outcome for that instance of the wagering game. The resultant outcome is then presented to a player of the gaming machine 310 by accessing the associated game assets, required for the resultant outcome, from the main memory 344. The CPU 342 causes the game assets to be presented to the player as outputs from the gaming machine 310 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 310 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 310 may include additional peripheral devices or more than one of each component shown in FIG. 3. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 4:
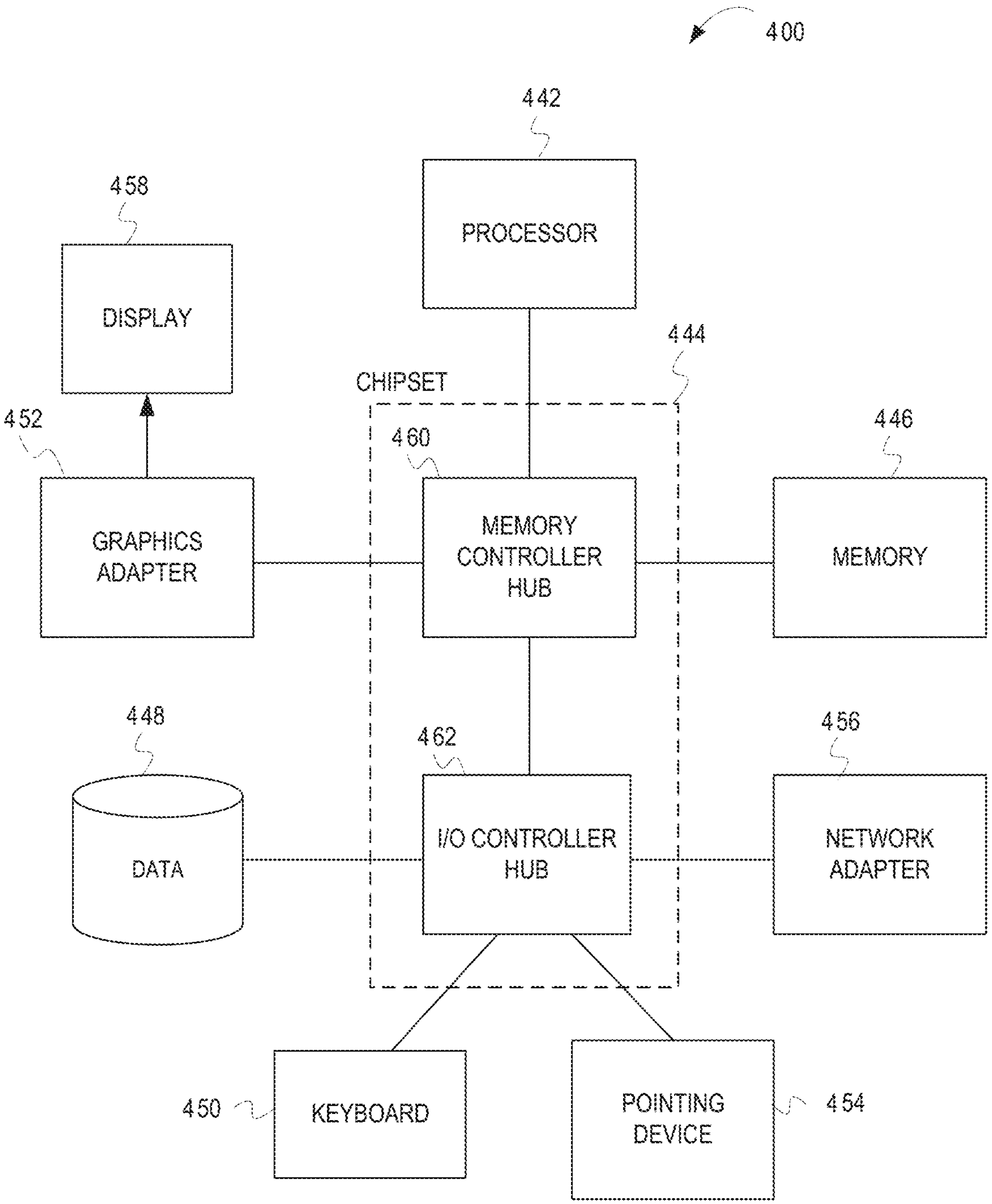
FIG. 4 is a diagram of a computer system in accordance with one or more example embodiments of the present disclosure.

FIG. 4 is a diagram of a computer system 400 in accordance with example embodiments of the present disclosure. The computer system 400 includes at least one processor 442 coupled to a chipset 444, as indicated in dashed lines. Also coupled to the chipset 444 are memory 446, a storage device 448, a keyboard 450, a graphics adapter 452, a pointing device 454, and a network adapter 456. A display 458 is coupled to the graphics adapter 452. In one embodiment, the functionality of the chipset 444 is provided by a memory controller hub 460 and an I/O controller hub 462. In another embodiment, the memory 446 is coupled directly to the processor 442 instead of to the chipset 444.

The storage device 448 is any non-transitory computer-readable storage medium, such as a hard drive, a compact disc read-only memory (CD-ROM), a DVD, or a solid-state memory device (e.g., a flash drive). The memory 446 holds instructions and data used by the processor 442. The pointing device 454 may be a mouse, a track pad, a track ball, or another type of pointing device, and it is used in combination with the keyboard 450 to input data into the computer system 400. The graphics adapter 452 displays images and other information on the display 458. The network adapter 456 couples the computer system 400 to a local or wide area network.

As is known in the art, the computer system 400 can have different and/or other components than those shown in FIG. 4. In addition, the computer system 400 can lack certain illustrated components. In one embodiment, the computer system 400 acting as the CMS 160 (FIG. 1) may lack the keyboard 450, pointing device 454, graphics adapter 452, and/or display 458. Moreover, the storage device 448 can be local and/or remote from the computer system 400 (such as embodied within a storage area network (SAN)). Moreover, other input devices, such as, for example, touch screens may be included.

The network adapter 456 (may also be referred to herein as a communication device) may include one or more devices for communicating using one or more of the communication media and protocols discussed herein.

In addition, some or all of the components of this general computer system 400 of FIG. 4 may be used as part of the processor and memory discussed above with respect to the systems or devices described herein.

In some embodiments, a gaming system may comprise several such computer systems 400. The gaming system may include load balancers, firewalls, and various other components for assisting the gaming system to provide services to a variety of user devices.

The computer system 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 448, loaded into the memory 446, and executed by the processor 442.

Figure 5:
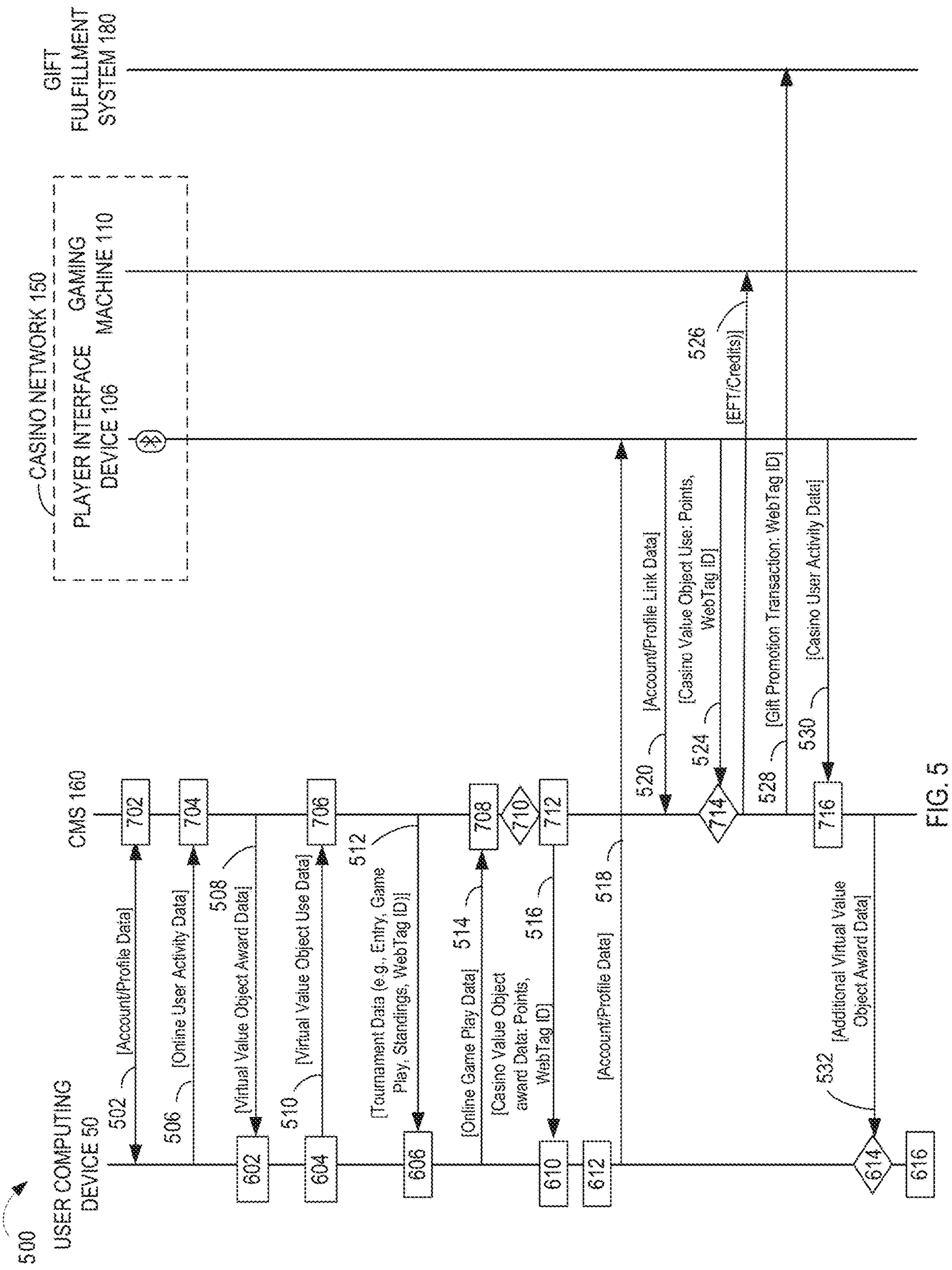
FIG. 5 is a flow diagram illustrating operations in accordance with one or more example embodiments of the present disclosure.

FIG. 5 is a flow diagram of a flow 500 illustrating bonusing platform operations in accordance with example embodiments of the present disclosure. The flow 500 will refer to a processor. It should be noted that the reference to the processor may refer to the same physical processor or it may be one of a set of a plurality of processors. The set of processors may operate in conjunction with each other and may be distributed across various networked devices (e.g., across the gaming system 100, within the architecture 200, within the gaming machine 310, within the computer system 400). The types of processors may include a central processing unit, a graphics processing unit, any combination of processors, etc. Flow 500 may be performed by one or more processors associated with any of FIG. 1, FIG. 2, FIG. 3, and/or FIG. 4, including any of user computing device 50, CMS 160, gaming machine 110, player interface device 106, and the gift fulfillment system 180 (as illustrated in FIG. 5). However, it should be noted that in some embodiments, as also shown in FIG. 1 and FIG. 2, operations described as being performed by, or associated with, the CMS 160 may also (or instead) be performed by, or associated with, one or more processors associated with the cloud computing platform 190 (as described in FIG. 1 or FIG. 2), the social network system(s) 24, the gift fulfillment system 180, the gateway 111, the gaming machine 110, the casino network 19, the communications network 18, the casino system 150, the virtual private network 206, the administrator computing device 250, the CPU 342, the processor 442, or a processor in another device mentioned herein, such as a processor associated with a table controller, a card-handling device, a camera controller, a game controller, a gaming server etc.

Figure 6:
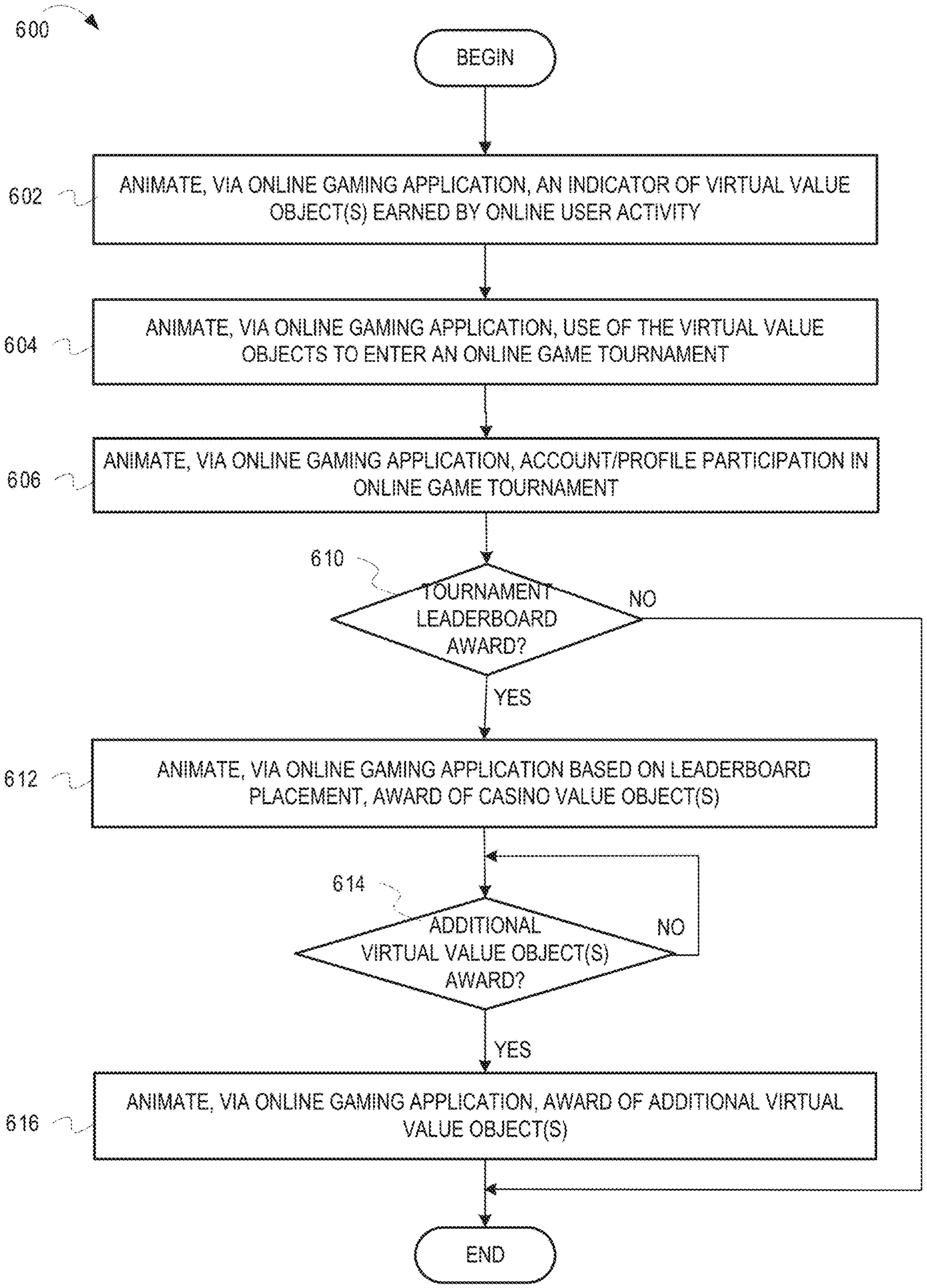
FIG. 6 is a flow diagram illustrating operations in accordance with one or more example embodiments of the present disclosure.
Figure 7:
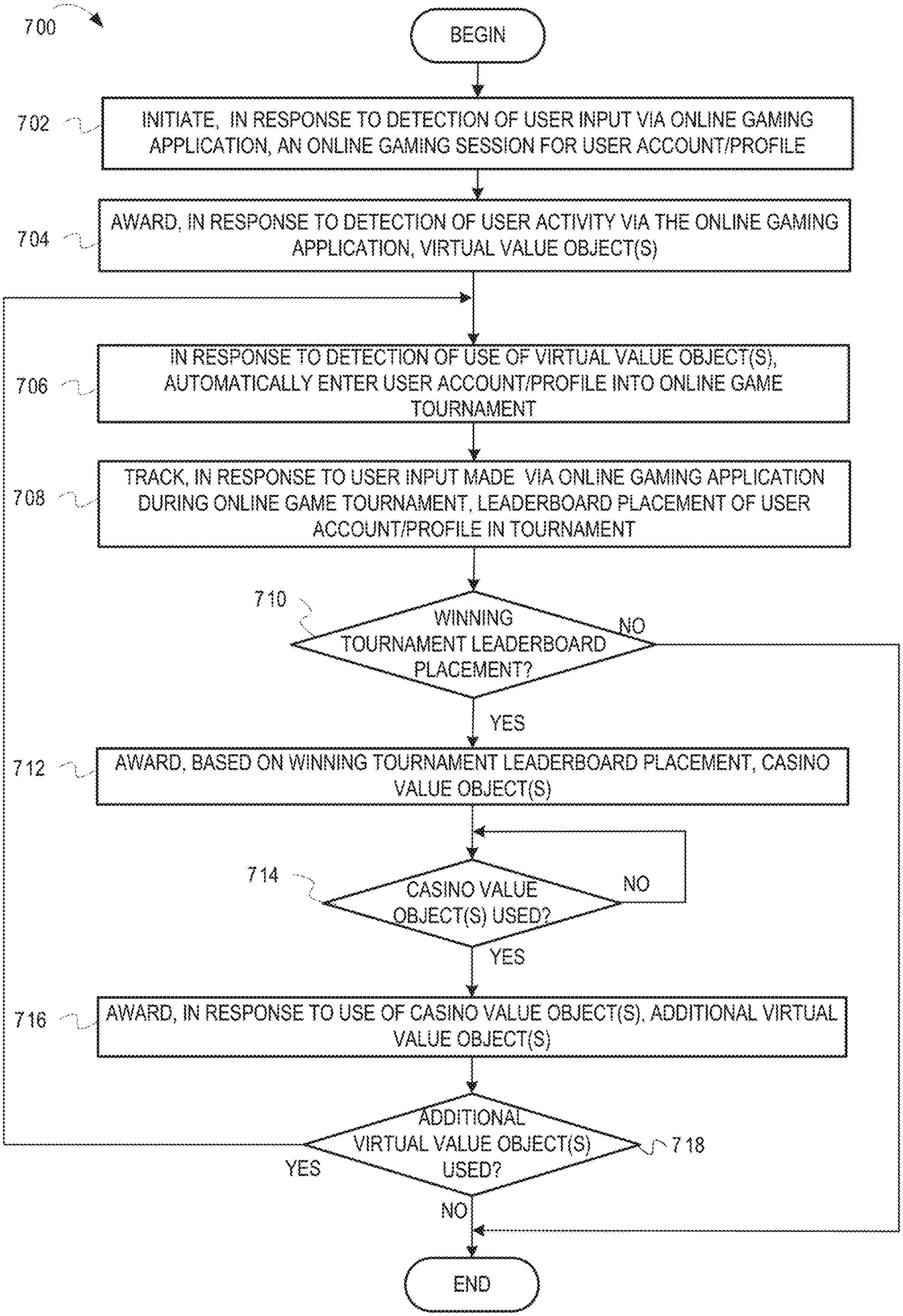
FIG. 7 is a flow diagram illustrating operations in accordance with one or more example embodiments of the present disclosure.

The flow 500 refers to elements of flow 600 (see FIG. 6) and/or elements of flow 700 (see FIG. 7). In one example, flow 600 is an example of flow elements performed by one or more electronic processors associated with the user computing device 50 (e.g., one or more processors that present and process operations of an online gaming application). Flow 700 is an example of flow elements performed by one or more electronic processors of the CMS 160 and/or of one or more processors associated with the CMS 160 such as one or more processors of any one or more of the cloud computing platform 190. FIG. 8, FIG. 9, FIG. 10A, FIG. 10B, FIG. 11, FIG. 12, FIG. 13, FIG. 14, FIG. 15A, FIG.

15B, FIG. 16A, FIG. 16B, FIG. 17A, FIG. 17B, FIG. 18, FIG. 19, FIG. 20, FIG. 21, FIG. 22A, FIG. 22B, FIG. 23A, FIG. 23B, and FIG. 24 are diagrams of exemplary gaming system(s) associated with one or more of the data flows shown in FIGS. 5, 6, and 7 according to one or more embodiments of the present disclosure. FIG. 8, FIG. 9, FIG. 10A, FIG. 10B, FIG. 11, FIG. 12, FIG. 13, FIG. 14, FIG. 15A, FIG. 15B, FIG. 16A, FIG. 16B, FIG. 17A, FIG. 17B, FIG. 18, FIG. 19, FIG. 20, FIG. 21, FIG. 22A, FIG. 22B, FIG. 23A, FIG. 23B, and FIG. 24 will be referenced in the descriptions of FIG. 5, FIG. 6, and/or FIG. 7.

Referring to FIG. 5, the flow 500 begins at processing block 502 where a processor connects (e.g., via a communications network) the user computing device 50 to the CMS 160 and links (e.g., authenticates) to at least one user account/profile used to track user activity. In the example of FIG. 5, reference to a "user account/profile" may refer to one or more linked user account/profile(s). For instance, in one embodiment, a single user account/profile is used to track both online user activity (e.g., use of an online gaming application by the user computing device 50) and also to track casino user activity (e.g., use of the gaming machine 110 or other devices of the casino system 150). Hence, in one embodiment, the CMS 160 can utilize a single identifier for a single user account/profile that tracks both non-casino user activity and casino user activity. In another embodiment, however, multiple user accounts/profiles are used to track user activity. For example, the user computing device 50 may (when accessing the online gaming application) connect to a first user account/profile associated with online (e.g., non-casino) game play. The first user account/profile may utilize a first user account/profile identifier that identifies a user account/profile that is authorized for access by one or more processors of online computing device(s) (e.g., via the user computing device 50, via the cloud computing platform 190, etc.). The first user account/profile may be used to track awarding of virtual value object(s) (e.g., virtual coins for online or non-casino game play/access) and to track online user activity (e.g., to track user activity for earning virtual coins, to track use of virtual coins to enter tournaments, to track user placement or results in online games or tournaments, etc.). In some embodiments, the first user account/profile is linked, via the CMS 160 (e.g., via a relational-database record in database 124), to a second user account/profile maintained by a given casino operator. The second user account/profile may include a second identifier that identifies a user account/profile (e.g., a customer loyalty account) of a second user database (e.g., database 124), which is authorized for access by one or more processors of the CMS 160.

Figure 14:
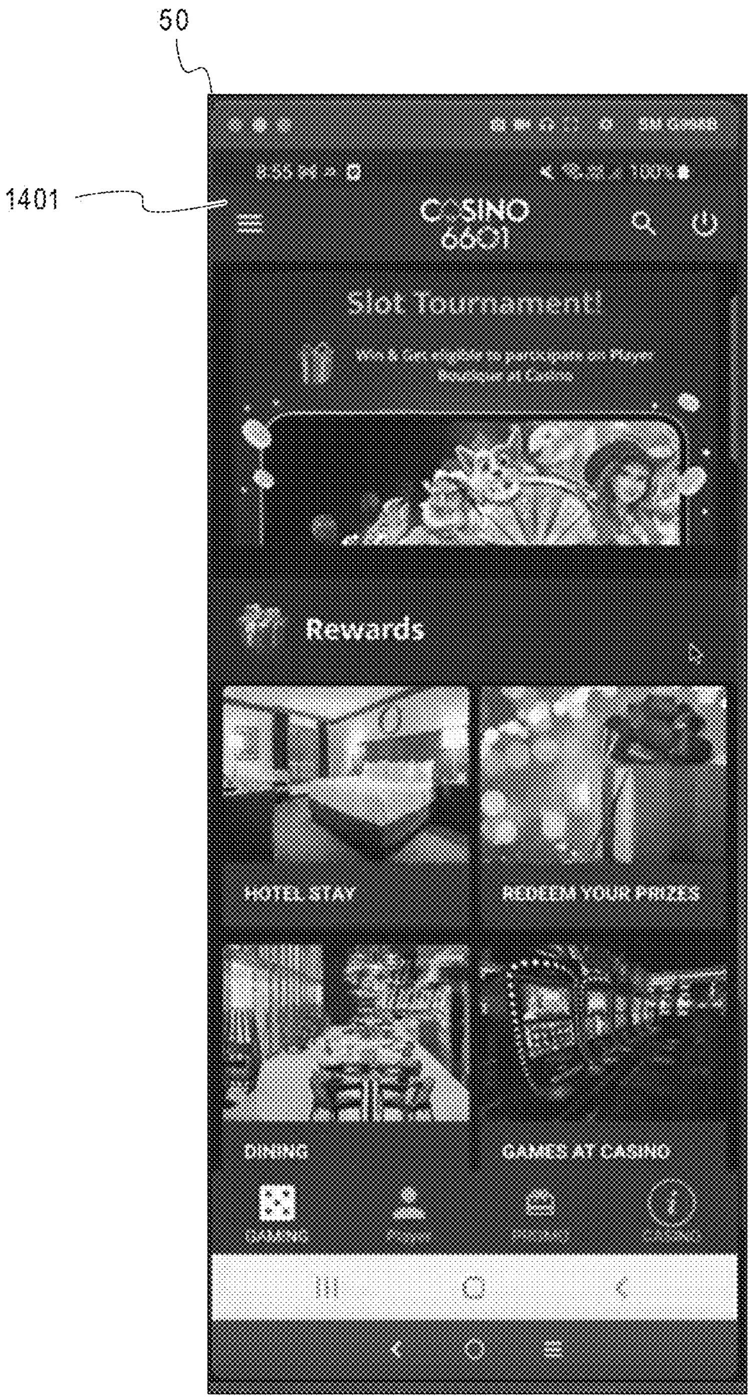
FIG. 14, FIG. 15A, FIG. 15B, FIG. 16A, FIG. 16B, FIG. 17A, and FIG. 17B are diagrams illustrating use of an online gaming application in accordance with one or more example embodiments of the present disclosure.

Referring to FIG. 5, in one example, in response to, or in association with, performance of processing block 502, a processor associated with CMS 160 performs processing block 702, which initiates, in response to detection of user input via the online gaming application, an online gaming session for a user account/profile. FIG. 14 illustrates an example of a user computing device 50 as a mobile device which runs an online gaming application 1401 (e.g., the "Casino 6601" mobile app).

Referring back to FIG. 5, flow 500 continues at processing block 506, where a processor detects online user activity that occurs via use of the user computing device 50. In response to, or in association with, performance of processing block 506, a processor associated with CMS 160 performs processing block 704, which awards one or more virtual value object(s) for the detected occurrence of online user activity via the online gaming application. In one example, the virtual value object(s) are items of value that are useable for access to one or more online game features, content, opportunities, etc. For example, the virtual value object(s) may be a first type of value object that does not have monetary exchange value, but instead has value to access and/or use the online game features, gaming content, gaming opportunities, etc. In one embodiment, the virtual value object(s) may be referred to herein as virtual coins.

Figure 15A:
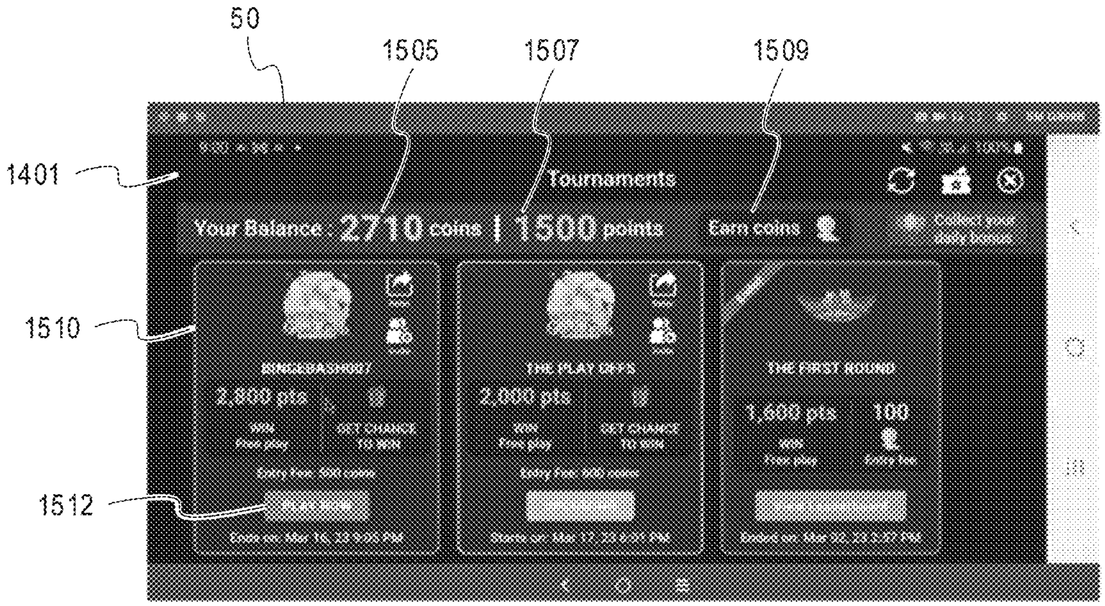
Figure 16A:
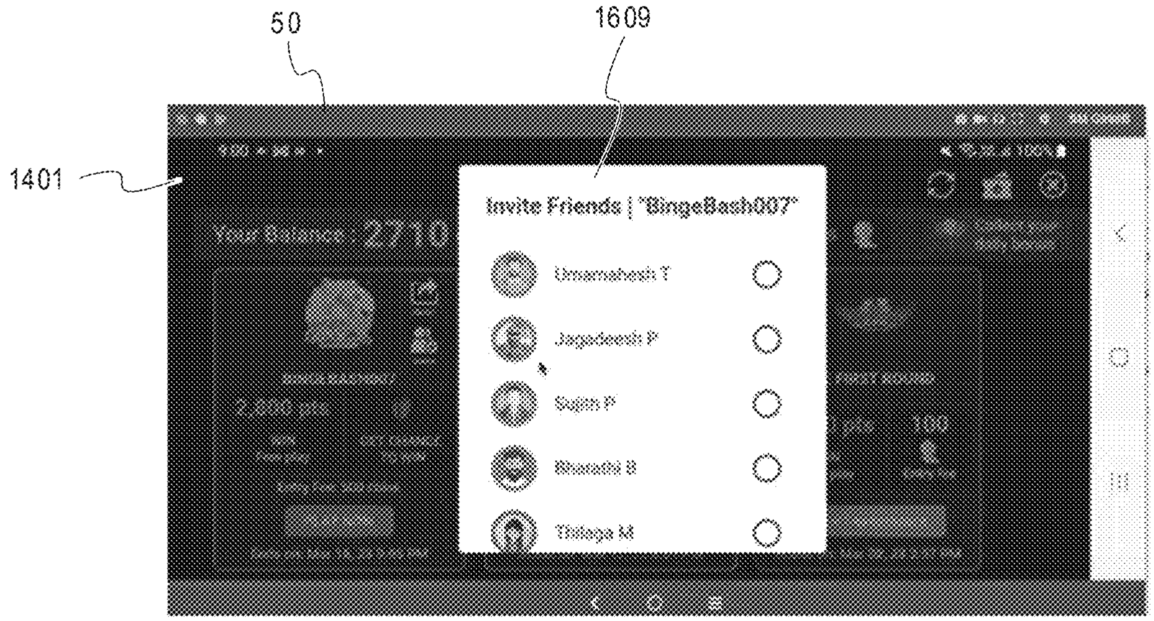
Figure 16B:
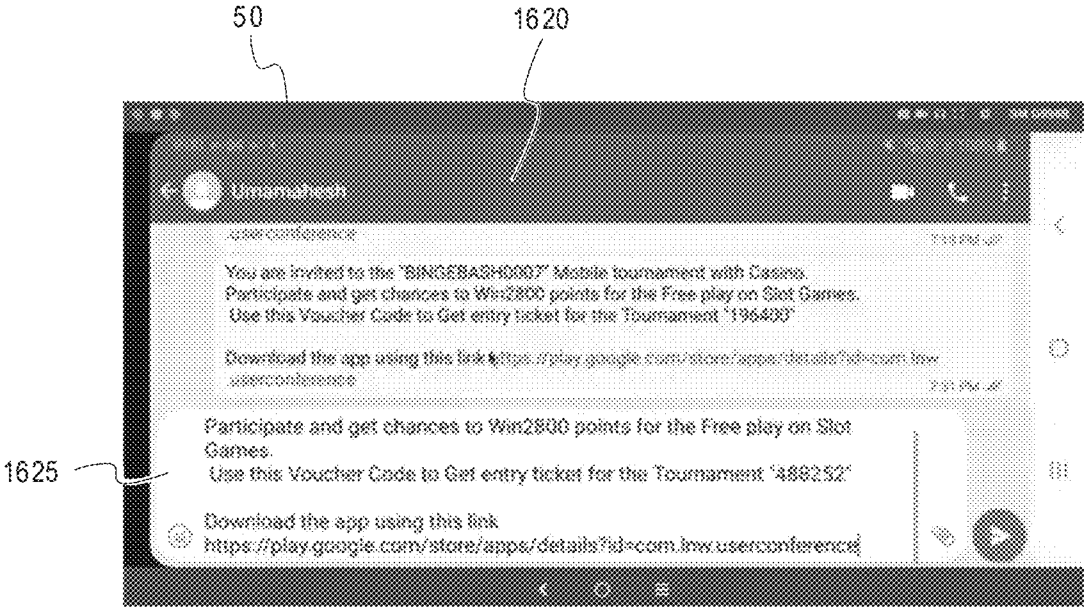

Referring back to FIG. 5, flow 500 continues at processing block 508, where a processor communicates (e.g., via a communications network) award data for the virtual value objects from the CMS 160 to the user computing device 50. In response to, or in association with, performance of processing block 508, a processor associated with user computing device 50 performs processing block 602, which animates, via the online gaming application, an indicator of the virtual value object(s) earned by online user activity. FIG. 15A illustrates an example of the user computing device 50, which animates, via the online gaming application 1401, a virtual coin meter 1505, which presents, as at least one indicator of virtual value object(s), a balance of virtual coins. The online gaming application 1401 presents an options control 1509, which, when selected, provides a plurality of ways to earn, via user activity, virtual coins. Examples of ways to earn virtual coins may include, but not be limited to, linking a casino account to an online account, creating a new online account, inviting social contacts to participate in a tournament, visiting a casino and playing on a slot machine or a gaming table, playing a daily bonus game, participating in and completing a reward quest promotion, etc. FIG. 16A illustrates one example of user activity that earns virtual coins. For example, the user computing device 50 presents, via the online gaming application 1401, a social contact list 1609 from which a user can select a social contact stored on the user computing device 50. In response to selecting a social contact from the list 1609, the user computing device 50 generates, via a social network application 1620 of the user computing device 50, a message 1625. The user computing device 50 copies into the message 1620 details related to a referral to the social contact, including a description of the invitation, a voucher code that allows the social contact to obtain entry to the tournament, a download link for the online gaming application 1401, etc. The voucher code can further be used, by a user account who received the message 1620 and/or by the user account/profile who sent the invitation, to earn additional virtual coins. The voucher code can be entered using a feature of the online gaming application 1401. The social network application 1620 may be integrated, via one or more APIs, with the social network system(s) 24 and/or with the online gaming application 1401.

Figure 15B:
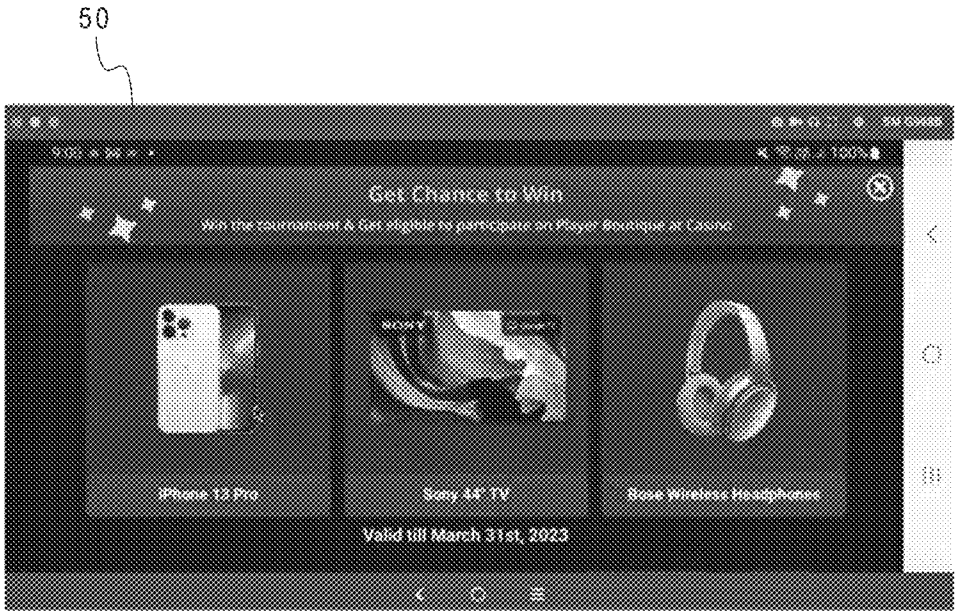

Referring back to FIG. 5, in response to, or in association with, performance of processing block 602, a processor associated with user computing device 50 performs processing block 604, which animates, via the online gaming application, use of the virtual value object (s to enter an online (i.e., non-casino) game tournament. The flow 500 continues at processing block 510, where a processor communicates (e.g., via a communications network) data, from the user computing device 50, indicating use of the virtual value object(s). In response to, or in association with, performance of processing block 510, a processor associated with CMS 160 performs processing block 706, which in response to detection of the use of the virtual value object(s), automatically enters the user account/profile into the online game tournament. The flow 500 continues at processing block 512, where a processor communicates data, from the CMS 160, indicating tournament data, such as a tournament entry identifier, game play data, random number generator (RNG) game results or standings, a tournament name identifier (e.g., a WebTag ID), etc. In response to, or in association with, performance of processing block 512, a processor associated with user computing device 50 performs processing block 606, which animates, via the online gaming application, participation by the user account/profile in the online game tournament. FIG. 15A illustrates an example of a tournament selection screen where at least one tournament indicator 1510 presents details about an available tournament in which the user account/profile can participate. The details indicate an entry fee (e.g., in virtual coins), a potential award for winning the tournament (e.g., a number of points and/or an option to participate in a gifting program), and a launch control 1512 (to initiate entry into the tournament). FIG. 15B illustrates an example of gifting program options available for participation in the tournament, such as gifts that are available to be earned by participation in the gifting program (or a portion/subset of select gifts that are available to be earned from an available gift inventory).

Figure 17A:
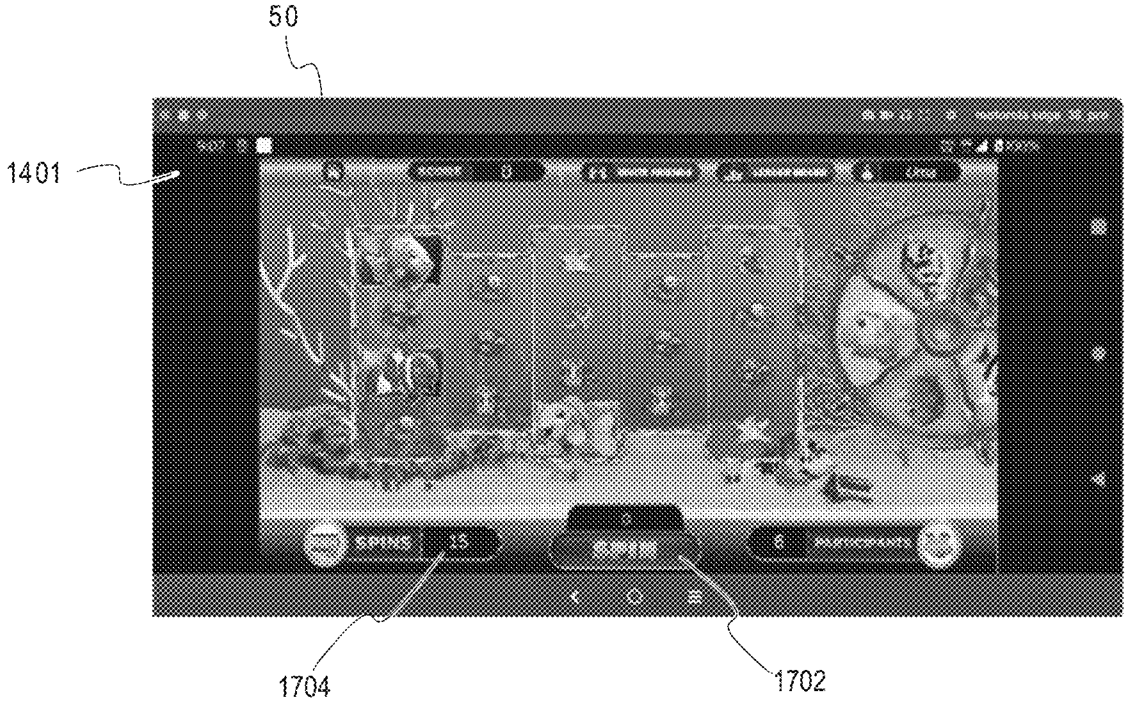

Referring back to FIG. 5, flow 500 continues at processing block 514, where a processor communicates data, from the user computing device 50, indicating online game play activity, such as selection of a spin/play control for each game played during the tournament. FIG. 17A illustrates an example of the user computing device 50 as it presents, via the online gaming application 1401, game play for the tournament. For example, a non-monetary, casino-type game is presented, with a spin control 1702 (e.g., for user input to spin or play the game) and a spin counter 1704 (to track the number of spins made toward a tournament spin limit).

Referring again to FIG. 5, in response to, or in association with, performance of processing block 514, a processor associated with CMS 160 performs processing block 708, which tracks, in response to user input made via the online gaming application during the online game tournament, a placement of the user account/profile in the tournament standings (e.g., a placement on a tournament leaderboard). In response to, or in association with, performance of processing block 708, a processor associated with CMS 160 performs processing block 710, which determines whether the user account/profile reached a certain winning placement on the leaderboard for the game tournament. In one embodiment, criteria for obtaining an award for the game tournament includes placement in one of a few top positions of the leaderboard. For instance, only a few winning user account/profiles at the top of the leaderboard may be eligible to receive an award. The number of user account/profiles eligible to receive an award may be specified during the configuration of the tournament (e.g., see FIG. 9, FIG. 10A and/or FIG. 10B).

In response to, or in association with, performance of processing block 710, a processor associated with CMS 160 performs processing block 712, which awards, based on the leaderboard placement, casino value object(s). As mentioned, the casino value object(s) may include loyalty-program points (also referred to herein as "points"), which can be used for various casino gaming activities. Also mentioned, the casino value object(s) may include eligibility for a casino gifting promotion.

Figure 17B:
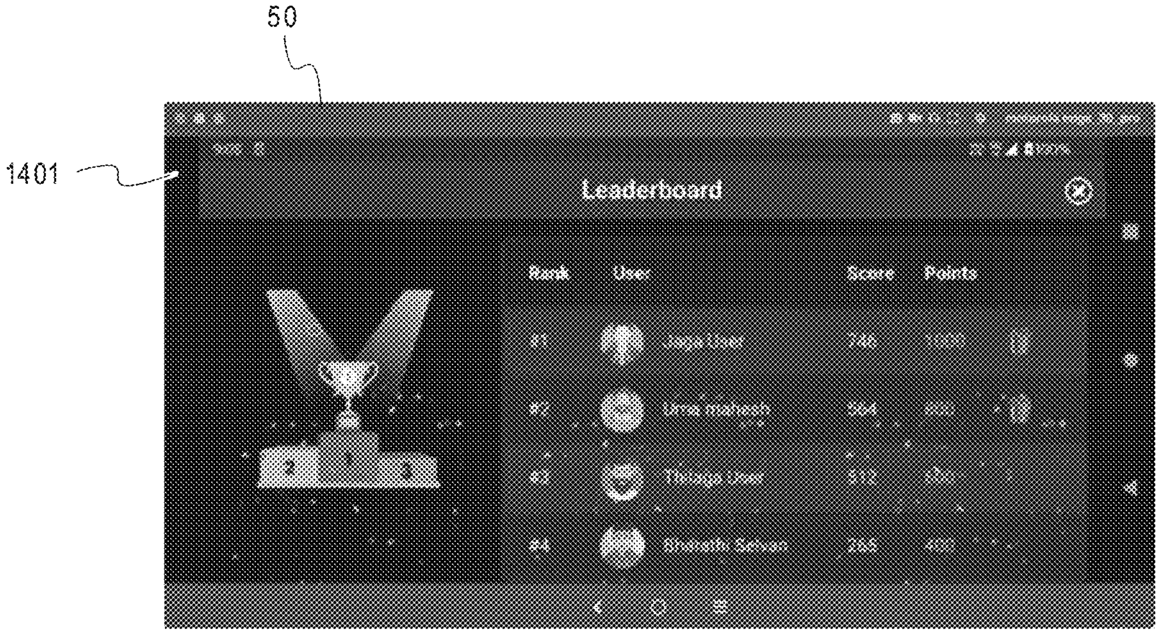

Referring back to FIG. 5, flow 500 continues at processing block 516, where a processor communicates data, from the CMS 160, indicating the award of the casino value object(s) (e.g., the number of points awarded), as well as any identifying information, such as the tournament name identifier (e.g., the WebTag ID). In response to, or in association with, performance of processing block 516, a processor associated with user computing device 50 performs processing block 610, which detects whether the data, from the CMS 160, indicates a tournament leaderboard award. In response to, or in association with, performance of processing block 610, a processor associated with user computing device 50 performs processing block 612, which animates, via the online gaming application based on the leaderboard placement, the award of the casino value object(s). FIG. 17B illustrates an example of the user computing device 50 animating, via the online gaming application 1401, a leaderboard for the tournament. The leaderboard animates the placement of the user account/profile in the tournament standings, including an indication of how many points were won and/or whether a winner is eligible to participate in the gifting promotion.

Referring back to FIG. 5, flow 500 continues at processing block 518, where a processor associated with user computing device 50, the player interface device 106, or some combination of both, communicates (e.g., via casino network 19) user account/profile data (e.g., login information) to initiate a casino gaming session.

Figure 18:
FIG. 18, FIG. 19, and FIG. 20 are diagrams illustrating use of online gaming awards in a casino environment and attainment of online value objects in accordance with one or more example embodiments of the present disclosure.

Referring again to FIG. 5, flow 500 continues at processing block 520, where a processor associated with player interface device 106 communicates, to the CMS 160, the request to login/link to and the account/profile data. In response, the CMS 160 initiates, in communication with the player interface device 106, the gaming machine 110 or some combination of both, an authorized and secure link or connection between the player interface device 106 and the user account/profile (e.g., stored via database 124) for the duration of the casino gaming session. Once linked to the user account/profile, the player interface device 106 can present (e.g., via a display associated with the player interface device 106, the gaming machine 110, the signage devices 122, etc.) the casino value object(s) (e.g., points and/or gifting program eligibility) that were awarded to the user account/profile from the online gaming session. FIG. 18 illustrates an example of a display 1801 of a gaming machine (e.g., of gaming machine 110) after a user account/profile has logged in via the player interface device 106 associated with the gaming machine 110. In one embodiment, the player interface device 106 is the iView4® player interface device or the iView Display Manager (iView DM™) player interface device, which are available from Light & Wonder, Inc. For instance, the iView4® player interface device or the iView DM™ permits the player to enter user input via a user interface. Further, the iView DM™ includes functionality to mix and scale video content for both game content of the gaming machine 110 as well as system-based content for the player interface device 106 for presentation on the same display screen. For example, in FIG. game content 1802 is animated and presented in an upper portion 1802 of the display 1801, while the system-based content (e.g., content associated with awards or promotion eligibilities of the CMS 160) is presented in a lower portion 1804 of the display 1801. The system-based content includes details of the gifting promotion inventory items that were made available to the user account/profile for being one of the top-placing winners in an online tournament. The gifting promotion inventory items may further include progress meters toward obtaining the particular items by casino game play or other user activities associated with the gifting promotion, as explained in further detail in the Ser. No. 17/483,036 Application already referred to herein, and which is incorporated by reference in its entirety.

In response to, or in association with, performance of processing block 520, a processor associated with player interface device 106 performs processing block 524 (also referred to as transaction 524), which, communicates, to the CMS 106, an indication of use of the casino value object(s) during the casino gaming session (e.g., use of the casino value object(s) via the casino system 150). For example, a player may use a feature of the player interface device 106 to access a customer loyalty account to which the casino value objects were stored. The player may provide user input via an input device of the gaming machine 110 and/or an input device of the player interface device 106 (e.g., via an iView® user interface). For instance, a processor associated with the player interface device 106 detects the user input and initiates the transaction 524. In one embodiment, the user input that initiates transaction 524 requests that the casino value objects (e.g., points) be converted into game credits (e.g., funded via electronic funds transfer (EFT) by the CMS 160 via funds from a customer loyalty budget account of a casino operator). In another embodiment, the user input indicates a request to use the casino value objects to redeem a gift via a gifting promotion. In one embodiment, the transaction 524 includes multiple requests, including both a request to convert points into redeemable game credits and a request to redeem points for a gifting promotion.

In response to, or in association with, performance of processing block 524, a processor associated with CMS 160 performs processing block 714, which detects whether there was an indication of the use of the casino value object(s). In one example, the CMS 160 detects, from the transaction 524, redemption of casino value objects (e.g., points) for game credits, which triggers processing block 526 (also referred to as transaction 526). In another example, the CMS 160 detects, from the transaction 524, redemption of casino value objects (e.g., points) for a gift associated with a gifting program, which triggers processing block 528 (also referred to as transaction 528).

Figure 19:
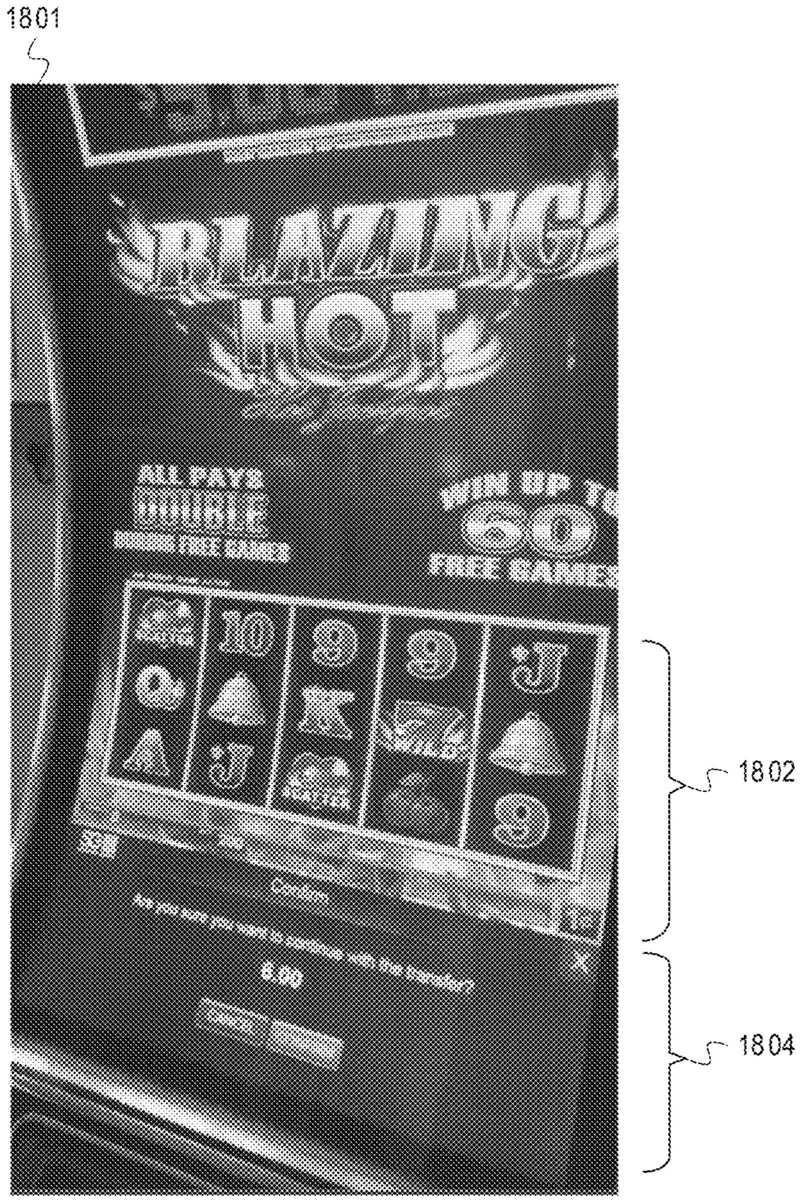

In one embodiment, the flow 500 continues at processing block 526, where a processor associated with the CMS 160 detects whether the casino value object(s) were used to place a bet on a wagering game (e.g., a slot game) controlled by the gaming machine 110 (e.g., controlled by the game controller 108). In some examples herein, the wagering game controlled by the gaming machine 110 may be referred to as an "in-casino" or a "casino" game, which indicates that the wagering game is type of wagering game that is available only at an authorized casino within an authorized gambling jurisdiction. If the casino value object(s) were used to access a feature of the wagering game (e.g. to bet on the wagering game), the CMS 160 can, at processing block 526, convert loyalty-program points into electronic monetary value (e.g., via electronic funds transfer (EFT), via advanced funds transfer (AFT), etc.), which is communicated (e.g., via the casino network 19) to the gaming machine 110 (i.e., to gaming controller 108), which adds game credits to a credit meter of the gaming machine 110, which the player can use to make a bet. FIG. 19 illustrates an example of the gaming machine display 1801, which presents in the upper section 1902 of the display 1801 wagering game content, and in the lower section 1904, the player interface device 106 presents information about converting loyalty-program points into game credits, which can be used for playing the wagering game content.

Referring again to FIG. 5, in one embodiment, the flow 500 continues at processing block 528, where a processor associated with the CMS 160 detects whether the casino value object(s) were used for a gifting promotion. In one embodiment, the processor associated with CMS 160 can track the particular gifting promotion that was earned using an identifier, such as the WebTag identifier associated with the tournament (e.g., see the web tag entry "BingeBash007WebTag" in input control 1027). The WebTag identifier can be used to determine which of the gifts from the gifting promotion inventory are exclusively provided to the player (or other such tournament winners) for their top placement in an online game tournament. The WebTag identifier can be used to match with a gifting promotion identifier stored in association with the CMS 160 (or with another device of the casino system 150).

Flow 500 continues at processing block 530, where a processor associated with the player interface device 106 or the gaming machine 110 transmits, to the CMS 160, data associated with casino user activity. For example, the casino user activity may include use of the casino value object(s) via a gaming machine or other authorized device associated with a casino. In response to, or in association with, performance of processing block 530, a processor associated with CMS 160 performs processing block 716, which awards, in response to use of the casino value object(s), additional virtual value object(s). The processor further associates the additional virtual value object(s) with the user account/profile for use via the online gaming application. For example, the additional virtual value object(s) are usable via the online gaming application to enter an additional online game tournament (e.g. having the same type of game content as the previously played online game tournament) when the user computing device 50 is external to the casino system 150 (e.g., when not in the physical location of the casino associated with casino system 150). For example, as shown in FIG. 7, at processing block 718 a processor detects whether additional virtual value object(s) are subsequently used (e.g., redeemed) via the online gaming application, such as to enter the online game tournament again. In some embodiments, a global positioning system (GPS) device of the user computing device 50 provides information about a location of the user computing device 50, which a processor (e.g., associated with CMS 160) can use to determine whether the user computing device 50 is inside or outside a geographic boundary associated with a physical location of a casino property, casino floor, etc. In one embodiment, the processor can prevent use of the additional virtual value object(s) via the online gaming application until the processor detects that the GPS coordinates of the user computing device 50 are external to coordinates associated with the geographic boundary of the casino property or portion(s) thereof. The use of the additional virtual value object(s) (via the online gaming application) provides an opportunity to obtain/earn additional casino value object(s) for use the next time the player visits the casino. Hence, use of the online gaming application provides an incentive to visit the physical casino environment (e.g., to use the casino value object(s)), and the use of the casino value object(s) are detected and rewarded with additional virtual value object(s) to incentivize use of the online gaming application when external to a physical casino.

Referring again to FIG. 5, flow 500 continues at processing block 532, where a processor associated with the CMS 160 communicates, to the user computing device 50, data that indicates the award of the additional virtual value object(s). In response to, or in association with, performance of processing block 532, a processor associated with user computing device 50 performs processing block 614, which determines whether the additional virtual value object(s)

were awarded. In response to, or in association with, performance of processing block 614, a processor associated with user computing device 50 performs processing block 616, which animates, via the online gaming application, an indication of the award of the additional virtual value object(s).

Figure 20:
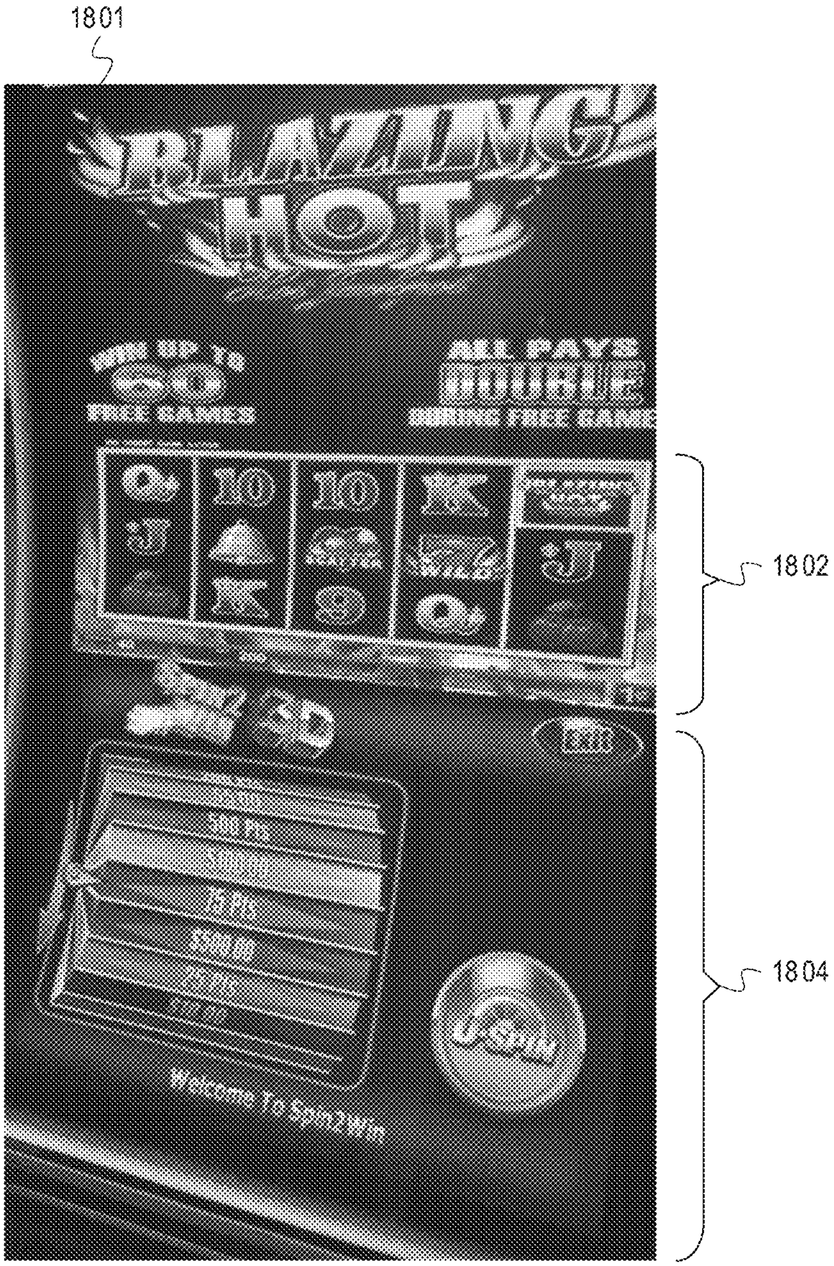

In one embodiment, players can earn additional virtual coins by completing activities within the casino (e.g., game activities, such as a Rewards Quest feature that requires the player to (a) play a secondary game or feature (e.g., play an EBS® U-Spin game to win a specific number of virtual coins, as illustrated in FIG. 20), (b) make a certain bet (e.g., make a $5 bet, make a bet on a specific game or type of game, make a maximum bet five times in a row, etc.), (c) etc.). Any additional virtual value object(s) awarded via casino user activity can be detected by the CMS 160, assigned to the user account/profile, and transmitted as a notification via the player interface device 106, via signage devices 122, via the user computing device 50, etc. In one embodiment, the CMS 160 communicates with the user computing device 50 using the notification service 215. In some embodiments, the CMS 160 can transmit the notification to the user computing device 50 via communicative connection with the player interface device 106 or the gaming machine 110. For example, user computing device 50 may connect via the communications device 103 (e.g., via a Bluetooth® wireless communication link, via a wired connection, etc.). In other embodiments, the CMS 160 transmits the notification via the communications network 18 (e.g., via a telecommunications network, via a mobile telephone network, etc.).

Figure 21:
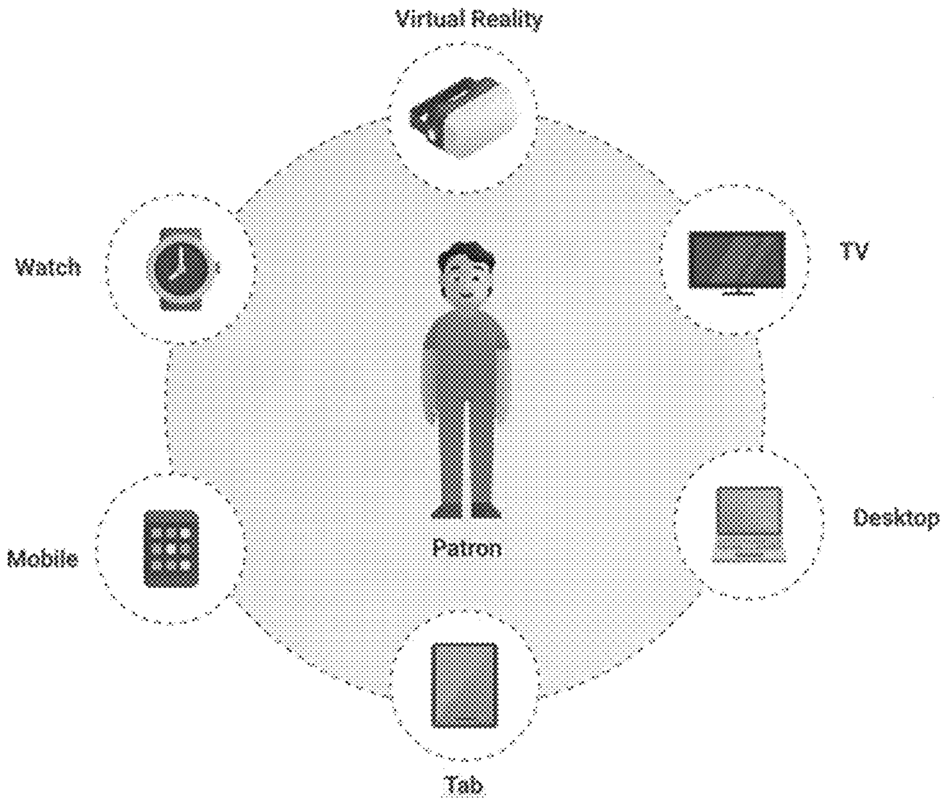
FIG. 21 is a diagram illustrating an omni-channel configuration in accordance with one or more example embodiments of the present disclosure.
Figure 22A:
FIG. 22A, FIG. 22B, FIG. 23A, FIG. 23B, and FIG. 24 are diagrams illustrating use of an online gaming application via a television display in accordance with one or more example embodiments of the present disclosure.
Figure 22B:
Figure 23A:
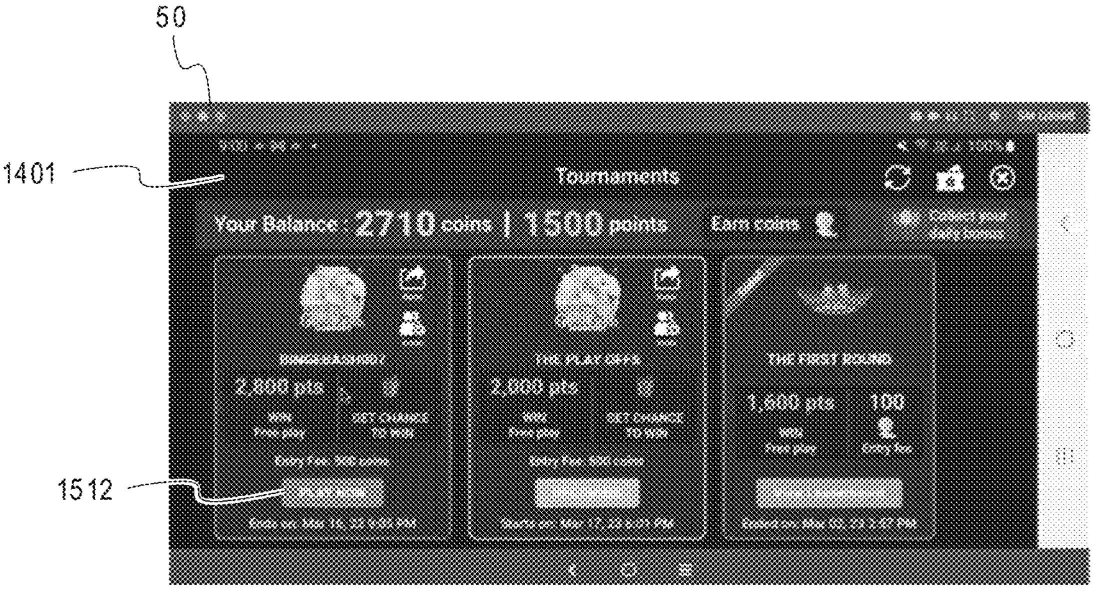
Figure 23B:
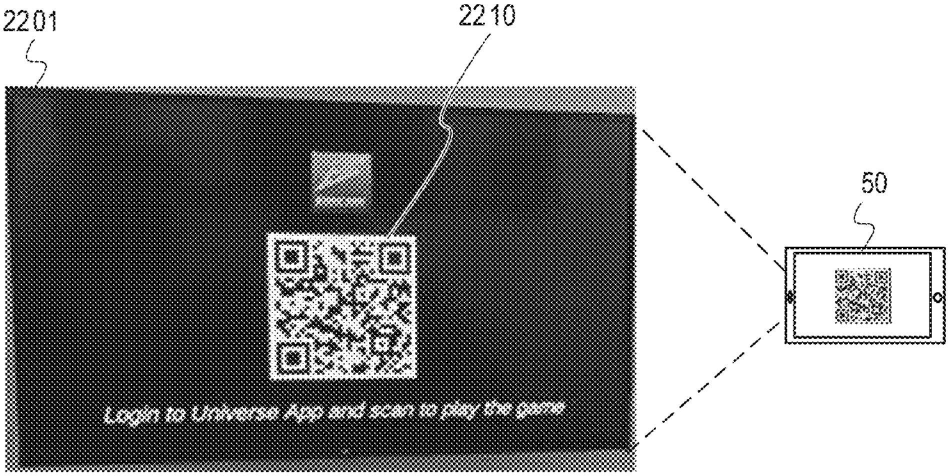
Figure 24:
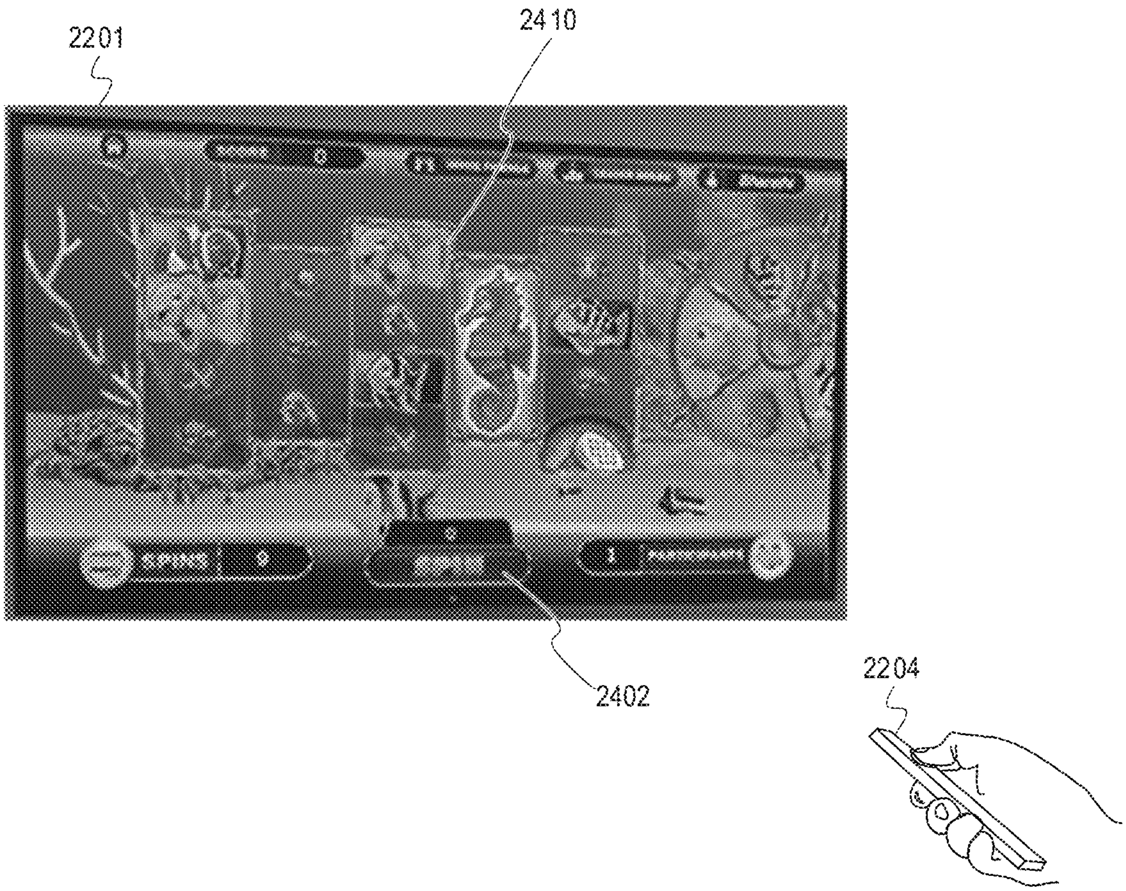

FIG. 21 illustrates examples of a variety of channels that can be used for presentation of the online gaming application. For example, the user computing device 50 may comprise one or more of a mobile device, a tablet, a desktop, a television, a virtual reality headset, a watch, etc. For example, in FIG. 22A, a television display 2201 (e.g., a hotel room television communicatively connected to the casino system 150) presents various icons for selection to launch various applications including an icon 2206 to launch the online gaming application. A user can use a remote controller 2204 to select the icon 2206. Once the icon 2206 is selected, a processor (e.g., associated with CMS 160) generates and provides for presentation via the television display 2201 (as illustrated in FIG. 22B) a coded identifier 2210 (e.g., a QR code, a 2D barcode, etc.) that includes coded information related to the online gaming application. After the coded identifier 2210 is presented via the television display 2201, a processor associated with the user computing device 50 detects user activity that launches the online gaming application via the user computing device 50 and select a particular input control (e.g., launch control 1512) to access online gaming content (e.g., to initiate entry into an online gaming tournament). After selection of the launch control 1512, the user computing device 50 can present an option to capture an image of the coded identifier 2210 in connection with a camera application of the user computing device 50. For instance, as illustrated in FIG. 23B, the user computing device 50 uses a built-in camera (or other image sensor) to capture an image of the coded identifier 2210. Upon capture of the coded identifier 2210, a processor associated with the user computing device 50 communicates with the CMS 160 such that the user account/profile becomes linked to an instance of the online gaming application associated with the television display 2201. Thus, as illustrated in FIG. 24, the television display 2201 animates the online gaming content 2410 (e.g., for the online game tournament). The user can continue to use the remote controller 2204 to interact with animated gaming content, such as to select the spin button 2402 (to spin game reels for each spin of the tournament).

In yet other embodiments, a mobile watch (also referred to as a smart watch) can present the online gaming application gaming content, with abilities to control online gaming user activity via a touch screen or via physical buttons incorporated into the frame of the smartwatch (e.g., a touchscreen spin or a button spin). In another embodiment, a virtual reality headset can present the online gaming application and can respond to user hand gestures as inputs of user activity (e.g., spins the tournament game reels using a hand gesture). In some embodiments, the online gaming application includes integration with a metaverse platform (e.g., via the Engage© VR platform available from Engage PLC) to present a virtual gaming environment that provides personalized content, advertisements, offers, promotions, value objects, etc.

The online gaming application can further provide opportunities for players to share content, such as sharing emojis. The online gaming application can further provide badges based on wins or other special items, such as a Silver Key special item which provides special online gaming privileges (e.g., to unlock gaming tournaments). In some embodiments, the online gaming application provides a community communication feature, such as a chat or community group where players can play in a tournament setting together.

FIG. 5, FIG. 6, and/or FIG. 7 described by way of example above, represent data processing methods (e.g., algorithms) that correspond to at least some instructions stored and executed by a processor and/or logic circuitry associated with the gaming system 100. However other embodiments can utilize processors and/or logic circuitry of any of the devices described for FIG. 2, FIG. 3, FIG. 4, FIG. 8, FIG. 9, FIG. 10A, FIG. 10B, FIG. 11, FIG. 12, FIG. 13, FIG. 14, FIG. 15A, FIG. 15B, FIG. 16A, FIG. 16B, FIG. 17A, FIG. 17B, FIG. 18, FIG. 19, FIG. 20, FIG. 21, FIG. 22A, FIG. 22B, FIG. 23A, FIG. 23B, and/or FIG. 24 to perform the above described functions associated with the disclosed concepts.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method comprising:

authenticating, by at least one of one or more electronic processors in response to detection of first user input via an online gaming application running on a user computing device external to a casino system, a user account authorized to access non-casino gaming content presented via the online gaming application, wherein the user computing device is not authorized to present casino gaming content and is not authorized to communicate with a game controller of the casino system;

awarding, by at least one of the one or more electronic processors in response to detection of second user input received via the online gaming application, one or more virtual value objects;

in response to detection of third user input that redeems the one or more virtual value objects, automatically entering, by at least one of the one or more electronic processors, the user account into an online game tournament conducted via the online gaming application;

computing, by at least one of the one or more electronic processors based on game outcome results for the user account during the online game tournament, a placement of the user account on a leaderboard for the online game tournament;

determining, by at least one of the one or more electronic processors in response to computing the placement, that the user account is a winning placement on the leaderboard; and awarding, by at least one of the one or more electronic processors in response to determining that the user account is the winning placement on the leaderboard, one or more casino value objects to the user account, wherein the one or more casino value objects are usable via the casino system, wherein the awarding the one or more casino value objects comprises: accessing, by at least one of the one or more electronic processors in response to determining the placement of the user account on the leaderboard, a web tag identifier configured for use with the online game tournament; matching, by at least one of the one or more electronic processors, the web tag identifier with a gifting promotion identifier associated with a gifting promotion accessible via the casino system; and awarding, by at least one of the one or more electronic processors, as the one or more casino value objects, access to a portion of an inventory of gift items available for the gifting promotion.

2. The method of claim 1 further comprising: associating, by at least one of the one or more electronic processors, the user account with a user identifier associated with one or more of a customer loyalty account or a patron profile managed by the casino system.

3. The method of claim 1, wherein the online gaming application is presented via a mobile device connected, via one or more communications networks, to an online gaming platform, and wherein the casino system comprises one or more of a gaming machine or a gaming table.

4. The method of claim 1, wherein the casino system is configured to present one or more casino wagering games in which a monetary value is bet, and wherein the non-casino gaming content comprises one or more non-monetary wagering games in which a non-monetary value is bet.

5. The method of claim 1, wherein the one or more virtual value objects are non-monetary objects that are redeemable to access one or more online gaming features available via the online gaming application, and wherein non-monetary objects are not redeemable to access casino gaming content via the casino system.

6. The method of claim 1, wherein the one or more casino value objects have a monetary exchange value within the casino system to initiate one or more operations to play a casino game, access a casino gifting promotion, or obtain a casino service.

7. The method of claim 1 further comprising: detecting, by at least one of the one or more electronic processors in response to detection of additional user input via a player interface device of the casino system, use of the one or more casino value objects; and in response to detecting the use of the one or more casino value objects, awarding one or more additional virtual value objects to the user account.

8. The method of claim 1, further comprising animating, by at least one of the one or more electronic processors via the online gaming application, the awarding of the one or more virtual value objects and the awarding of the one or more casino value objects.

9. A system comprising:

a computer memory; and one or more electronic processors configured to execute instructions stored via the computer memory, wherein execution of the instructions cause the system to perform operations to:

authenticate, in response to detection of first user input via an online gaming application running on a user computing device external to a casino system, a user account authorized to access non-casino gaming content presented via the online gaming application, wherein the user computing device is not authorized to present casino gaming content and is not authorized to communicate with a game controller of the casino system;

award, in response to detection of second user input received via the online gaming application, one or more virtual value objects;

in response to detection of third user input that redeems the one or more virtual value objects, automatically enter the user account into an online game tournament conducted via the online gaming application;

compute, based on game outcome results for the user account during the online game tournament, a placement of the user account on a leaderboard for the online game tournament;

determine, in response to computation of the placement, that the user account is a winning placement on the leaderboard; and award, in response to determination that the user account is the winning placement on the leaderboard, one or more casino value objects to the user account, wherein the one or more casino value objects are usable via the casino system, wherein the one or more electronic processors configured to execute the instructions to award the one or more casino value objects are configured to execute instructions that cause the system to perform operations to: access, in response to determination of the placement of the user account on the leaderboard, a web tag identifier configured for use with the online game tournament; match the web tag identifier with a gifting promotion identifier associated with a gifting promotion accessible via the casino system; and award, as the one or more casino value objects, access to a portion of an inventory of gift items available for the gifting promotion.

10. The system of claim 9, wherein the one or more electronic processors are further configured to execute instructions that cause the system to perform operations to: associate the user account with a user identifier associated with one or more of a customer loyalty account or a patron profile managed by the casino system, wherein the online gaming application is presented via a mobile device connected, via one or more communications networks, to an online gaming platform, wherein the casino system comprises one or more of a gaming machine or a gaming table, wherein the casino system is configured to present one or more casino wagering games in which a monetary value is bet, and wherein the non-casino gaming content comprises one or more non-monetary wagering games in which a non-monetary value is bet.

11. The system of claim 9, wherein the one or more virtual value objects are non-monetary objects that are redeemable to access one or more online gaming features available via the online gaming application, wherein the non-monetary objects are not redeemable to access casino gaming content via the casino system, and wherein the one or more casino value objects have a monetary exchange value within the casino system to initiate one or more operations to play a casino game, access a casino gifting promotion, or obtain a casino service.

12. The system of claim 9, wherein the one or more electronic processors are further configured to execute instructions that cause the system to perform operations to: detect, in response to detection of additional user input via a player interface device of the casino system, use of the one or more casino value objects; in response to detection of the use of the one or more casino value objects, award one or more additional virtual value objects to the user account; and animate, via the online gaming application, the awarding of the one or more virtual value objects and the awarding of the one or more casino value objects.

13. A method comprising:

authenticating, by at least one of one or more electronic processors in response to detection of first user input via an online gaming application running on a user computing device external to a casino system, a user account authorized to access non-casino gaming content presented via the online gaming application, wherein the user computing device is not authorized to present casino gaming content and is not authorized to communicate with a game controller of the casino system;

awarding, by at least one of the one or more electronic processors in response to detection of second user input received via the online gaming application, one or more virtual value objects;

in response to detection of third user input that redeems the one or more virtual value objects, automatically entering, by at least one of the one or more electronic processors, the user account into an online game tournament conducted via the online gaming application;

computing, by at least one of the one or more electronic processors based on game outcome results for the user account during the online game tournament, a placement of the user account on a leaderboard for the online game tournament;

determining, by at least one of the one or more electronic processors in response to computing the placement, that the user account is a winning placement on the leaderboard;

awarding, by at least one of the one or more electronic processors in response to determining that the user account is the winning placement on the leaderboard, one or more casino value objects to the user account, wherein the one or more casino value objects are usable via the casino system;

detecting, by at least one of the one or more electronic processors in response to detection of additional user input made via the online gaming application, a request to generate an invitation by the user account to participate in the online game tournament;

generating, by at least one of the one or more electronic processors, a referral code associated with the invitation;

transmitting, by at least one of the one or more electronic processors, the referral code to a social network application linked, via one or more application program interfaces, with the online gaming application, wherein the awarding of the one or more virtual value objects is in response to detecting, by at least one of the one or more electronic processors, use of the referral code;

detecting, by at least one of the one or more electronic processors, a selection of a user interface control to launch the online gaming application via a display device;

generating, by at least one of the one or more electronic processors in response to detecting the request to generate the invitation, a coded identifier for presentation via the display device;

detecting, by at least one of the one or more electronic processors, an image capture of the coded identifier by a camera of a mobile device logged into the online gaming application using the user account; and launching, in response to decoding the coded identifier by at least one of the one or more electronic processors, the online gaming application via the display device.

14. A system comprising:

a computer memory; and one or more electronic processors configured to execute instructions stored via the computer memory, wherein execution of the instructions cause the system to perform operations to:

authenticate, in response to detection of first user input via an online gaming application running on a user computing device external to a casino system, a user account authorized to access non-casino gaming content presented via the online gaming application, wherein the user computing device is not authorized to present casino gaming content and is not authorized to communicate with a game controller of the casino system;

award, in response to detection of second user input received via the online gaming application, one or more virtual value objects;

in response to detection of third user input that redeems the one or more virtual value objects, automatically enter the user account into an online game tournament conducted via the online gaming application;

compute, based on game outcome results for the user account during the online game tournament, a placement of the user account on a leaderboard for the online game tournament;

determine, in response to computation of the placement, that the user account is a winning placement on the leaderboard;

award, in response to determination that the user account is the winning placement on the leaderboard, one or more casino value objects to the user account, wherein the one or more casino value objects are usable via the casino system;

detect, in response to detection of additional user input made via the online gaming application, a request to generate an invitation by the user account to participate in the online game tournament;

generate a referral code associated with the invitation;

transmit the referral code to a social network application linked, via one or more application program interfaces, with the online gaming application, wherein the one or more virtual value objects are awarded in response to detection of use of the referral code;

detect a selection of a user interface control to launch the online gaming application via a display device;

generate, in response to detection of the request to generate the invitation, a coded identifier for presentation via the display device;

detect an image capture of the coded identifier by a camera of a mobile device logged into the online gaming application using the user account; and launch, in response to decoding of the coded identifier, the online gaming application via the display device.

* * * * *